United States Patent
Teague et al.

(10) Patent No.: US 9,210,651 B2
(45) Date of Patent: Dec. 8, 2015

(54) METHOD AND APPARATUS FOR BOOTSTRAPING INFORMATION IN A COMMUNICATION SYSTEM

(75) Inventors: Edward Harrison Teague, San Diego, CA (US); Fatih Ulupinar, San Diego, CA (US); Rajat Prakash, San Diego, CA (US); Aamod Khandekar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1412 days.

(21) Appl. No.: 11/261,065

(22) Filed: Oct. 27, 2005

(65) Prior Publication Data

US 2007/0097897 A1    May 3, 2007

(51) Int. Cl.
*H04L 12/28* (2006.01)
*H04W 48/12* (2009.01)

(52) U.S. Cl.
CPC ..................................... *H04W 48/12* (2013.01)

(58) Field of Classification Search
USPC .......................................... 370/312, 392, 474
See application file for complete search history.

(56) References Cited

U.S. PATENT DOCUMENTS

| | | |
|---|---|---|
| 4,393,276 A | 7/1983 | Steele et al. |
| 4,554,668 A | 11/1985 | Deman et al. |
| 4,747,137 A | 5/1988 | Matsunaga |
| 4,783,779 A | 11/1988 | Takahata et al. |
| 4,783,780 A | 11/1988 | Alexis |
| 4,975,952 A | 12/1990 | Mabey et al. |
| 5,008,900 A | 4/1991 | Critchlow et al. |
| 5,115,248 A | 5/1992 | Roederer et al. |
| 5,268,694 A | 12/1993 | Jan et al. |
| 5,282,222 A | 1/1994 | Fattouche et al. |
| 5,363,408 A | 11/1994 | Paik et al. |
| 5,371,761 A | 12/1994 | Daffara et al. |
| 5,384,810 A | 1/1995 | Amrany et al. |
| 5,406,551 A | 4/1995 | Saito et al. |
| 5,410,538 A | 4/1995 | Roche et al. |
| 5,455,839 A | 10/1995 | Eyuboglu et al. |
| 5,465,253 A | 11/1995 | Rahnema |
| 5,491,727 A | 2/1996 | Petit et al. |
| 5,513,379 A | 4/1996 | Benveniste et al. |
| 5,539,748 A | 7/1996 | Raith |
| 5,548,582 A | 8/1996 | Brajal et al. |
| 5,553,069 A | 9/1996 | Ueno et al. |

(Continued)

FOREIGN PATENT DOCUMENTS

| | | |
|---|---|---|
| CA | 2348137 | 11/2001 |
| CA | 2477536 | 9/2003 |

(Continued)

OTHER PUBLICATIONS

International Search Report—PCT/US06/060328, International Search Authority—European Patent Office—Mar. 30, 2007.

(Continued)

*Primary Examiner* — Phuc Tran
(74) *Attorney, Agent, or Firm* — Paul Kuo

(57) ABSTRACT

Accordingly, a method and apparatus are provided wherein an apparatus comprises plurality of electronic devices, each having a logic, wherein the apparatus is configured for receiving a preamble comprising frame structure parameters; extracting said frame structure parameters from said preamble; and determining a frame structure by demodulating said frame structure parameters.

30 Claims, 3 Drawing Sheets

(56) References Cited

U.S. PATENT DOCUMENTS

| | | | |
|---|---|---|---|
| 5,583,869 A | 12/1996 | Grube et al. |
| 5,594,738 A | 1/1997 | Crisler et al. |
| 5,604,744 A | 2/1997 | Andersson et al. |
| 5,612,978 A | 3/1997 | Blanchard et al. |
| 5,625,876 A | 4/1997 | Gilhousen et al. |
| 5,684,491 A | 11/1997 | Newman et al. |
| 5,726,978 A | 3/1998 | Frodigh et al. |
| 5,732,113 A | 3/1998 | Schmidl et al. |
| 5,745,487 A | 4/1998 | Hamaki |
| 5,768,276 A | 6/1998 | Diachina et al. |
| 5,790,537 A | 8/1998 | Yoon et al. |
| 5,812,938 A | 9/1998 | Gilhousen et al. |
| 5,815,488 A | 9/1998 | Williams et al. |
| 5,822,368 A | 10/1998 | Wang et al. |
| 5,828,650 A | 10/1998 | Malkamaki et al. |
| 5,838,268 A | 11/1998 | Frenkel et al. |
| 5,867,478 A | 2/1999 | Baumm et al. |
| 5,870,393 A | 2/1999 | Yano et al. |
| 5,887,023 A | 3/1999 | Mabuchi et al. |
| 5,907,585 A | 5/1999 | Suzuki et al. |
| 5,920,571 A | 7/1999 | Houck et al. |
| 5,926,470 A | 7/1999 | Tiedemann, Jr. |
| 5,933,421 A | 8/1999 | Alamouti et al. |
| 5,949,814 A | 9/1999 | Odenwalder et al. |
| 5,953,325 A | 9/1999 | Willars et al. |
| 5,955,992 A | 9/1999 | Shattil et al. |
| 5,956,642 A | 9/1999 | Larsson et al. |
| 5,995,992 A | 11/1999 | Eckard et al. |
| 5,999,826 A | 12/1999 | Whinnett |
| 6,002,942 A | 12/1999 | Park et al. |
| 6,016,123 A | 1/2000 | Barton et al. |
| 6,038,150 A | 3/2000 | Yee et al. |
| 6,038,263 A | 3/2000 | Kotzin et al. |
| 6,038,450 A | 3/2000 | Brink et al. |
| 6,052,364 A | 4/2000 | Chalmers et al. |
| 6,061,337 A | 5/2000 | Light et al. |
| 6,067,315 A | 5/2000 | Sandin |
| 6,075,350 A | 6/2000 | Peng et al. |
| 6,075,797 A | 6/2000 | Thomas |
| 6,076,114 A | 6/2000 | Wesley |
| 6,088,345 A | 7/2000 | Sakoda et al. |
| 6,088,592 A | 7/2000 | Doner et al. |
| 6,108,323 A | 8/2000 | Gray et al. |
| 6,108,550 A | 8/2000 | Wiorek et al. |
| 6,112,094 A | 8/2000 | Dentt et al. |
| 6,128,776 A | 10/2000 | Kang et al. |
| 6,138,037 A | 10/2000 | Jaamies |
| 6,141,317 A | 10/2000 | Marchok et al. |
| 6,154,484 A | 11/2000 | Lee et al. |
| 6,169,910 B1 | 1/2001 | Tamil et al. |
| 6,172,993 B1 | 1/2001 | Kim et al. |
| 6,175,550 B1 | 1/2001 | Van Nee et al. |
| 6,175,650 B1 | 1/2001 | Sindhu et al. |
| 6,176,550 B1 | 1/2001 | Lamart et al. |
| 6,198,775 B1 | 3/2001 | Khayrallah et al. |
| 6,215,983 B1 | 4/2001 | Dogan et al. |
| 6,226,280 B1 | 5/2001 | Roark et al. |
| 6,232,918 B1 | 5/2001 | Wax et al. |
| 6,240,129 B1 | 5/2001 | Reusens et al. |
| 6,249,683 B1 | 6/2001 | Lundby et al. |
| 6,256,478 B1 | 7/2001 | Allen et al. |
| 6,271,946 B1 | 8/2001 | Chang et al. |
| 6,272,122 B1 | 8/2001 | Wee |
| 6,310,704 B1 | 10/2001 | Dogan et al. |
| 6,317,435 B1 | 11/2001 | Tiedemann, Jr. et al. |
| 6,335,922 B1 | 1/2002 | Tiedemann, Jr. et al. |
| 6,337,659 B1 | 1/2002 | Kim et al. |
| 6,337,983 B1 | 1/2002 | Bonta et al. |
| 6,353,637 B1 | 3/2002 | Mansour et al. |
| 6,363,060 B1 | 3/2002 | Sarkar |
| 6,374,115 B1 | 4/2002 | Barnes et al. |
| 6,377,539 B1 | 4/2002 | Kang et al. |
| 6,377,809 B1 | 4/2002 | Rezaiifar et al. |
| 6,388,998 B1 | 5/2002 | Kasturia et al. |
| 6,393,008 B1 | 5/2002 | Cheng et al. |
| 6,393,012 B1 | 5/2002 | Pankaj |
| 6,401,062 B1 | 6/2002 | Murashima |
| 6,438,369 B1 | 8/2002 | Huang et al. |
| 6,449,246 B1 | 9/2002 | Barton et al. |
| 6,466,800 B1 | 10/2002 | Sydon et al. |
| 6,473,467 B1 | 10/2002 | Wallace et al. |
| 6,477,317 B1 | 11/2002 | Itokawa |
| 6,478,422 B1 | 11/2002 | Hansen |
| 6,483,820 B1 | 11/2002 | Davidson et al. |
| 6,487,243 B1 | 11/2002 | Hwang et al. |
| 6,496,790 B1 | 12/2002 | Kathavate et al. |
| 6,501,810 B1 | 12/2002 | Karim et al. |
| 6,507,601 B2 | 1/2003 | Parsa et al. |
| 6,519,462 B1 | 2/2003 | Lu et al. |
| 6,529,525 B1 | 3/2003 | Pecen et al. |
| 6,535,666 B1 | 3/2003 | Dogan et al. |
| 6,539,008 B1 | 3/2003 | Ahn et al. |
| 6,539,213 B1 | 3/2003 | Richards et al. |
| 6,542,485 B1 | 4/2003 | Mujtaba |
| 6,542,743 B1 | 4/2003 | Soliman |
| 6,563,806 B1 | 5/2003 | Yano et al. |
| 6,563,881 B1 | 5/2003 | Sakoda et al. |
| 6,577,739 B1 | 6/2003 | Hurtig et al. |
| 6,584,140 B1 | 6/2003 | Lee et al. |
| 6,590,881 B1 | 7/2003 | Wallace et al. |
| 6,597,746 B1 | 7/2003 | Amrany et al. |
| 6,601,206 B1 | 7/2003 | Marvasti |
| 6,614,857 B1 | 9/2003 | Buehrer et al. |
| 6,625,172 B2 | 9/2003 | Odenwalder et al. |
| 6,636,568 B2 | 10/2003 | Kadous et al. |
| 6,654,339 B1 | 11/2003 | Bohnke et al. |
| 6,654,431 B1 | 11/2003 | Barton et al. |
| 6,657,949 B1 | 12/2003 | Jones, IV et al. |
| 6,658,258 B1 | 12/2003 | Chen et al. |
| 6,674,787 B1 | 1/2004 | Dick et al. |
| 6,674,810 B1 | 1/2004 | Cheng et al. |
| 6,675,012 B2 * | 1/2004 | Gray ............................ 455/423 |
| 6,678,318 B1 | 1/2004 | Lai et al. |
| 6,690,951 B1 | 2/2004 | Cuffaro et al. |
| 6,693,952 B1 | 2/2004 | Chuah et al. |
| 6,701,165 B1 | 3/2004 | Ho et al. |
| 6,704,571 B1 | 3/2004 | Moon |
| 6,711,400 B1 | 3/2004 | Aura |
| 6,717,908 B2 | 4/2004 | Vijayan et al. |
| 6,721,568 B1 | 4/2004 | Gustavsson et al. |
| 6,724,719 B1 | 4/2004 | Tong et al. |
| 6,731,602 B1 | 5/2004 | Watanabe et al. |
| 6,735,244 B1 | 5/2004 | Hasegawa et al. |
| 6,744,743 B2 | 6/2004 | Walton et al. |
| 6,748,220 B1 | 6/2004 | Chow et al. |
| 6,751,444 B1 | 6/2004 | Meiyappan |
| 6,751,456 B2 | 6/2004 | Bilgic |
| 6,754,511 B1 | 6/2004 | Halford et al. |
| 6,763,009 B1 | 7/2004 | Bedekar et al. |
| 6,765,969 B1 | 7/2004 | Vook et al. |
| 6,776,165 B2 | 8/2004 | Jin |
| 6,776,765 B2 | 8/2004 | Soukup et al. |
| 6,778,513 B2 | 8/2004 | Kasapi et al. |
| 6,785,341 B2 | 8/2004 | Walton et al. |
| 6,798,736 B1 | 9/2004 | Black et al. |
| 6,799,043 B2 | 9/2004 | Tiedemann, Jr. et al. |
| 6,802,035 B2 | 10/2004 | Catreux et al. |
| 6,804,307 B1 | 10/2004 | Popovic |
| 6,813,284 B2 | 11/2004 | Vayanos et al. |
| 6,821,535 B2 | 11/2004 | Nurmi et al. |
| 6,828,293 B1 | 12/2004 | Hazenkamp et al. |
| 6,829,293 B2 | 12/2004 | Jones et al. |
| 6,831,943 B1 | 12/2004 | Dabak et al. |
| 6,842,487 B1 | 1/2005 | Larsson |
| 6,850,481 B2 | 2/2005 | Wu et al. |
| 6,850,509 B2 | 2/2005 | Lee et al. |
| 6,862,271 B2 | 3/2005 | Medvedev et al. |
| 6,870,808 B1 | 3/2005 | Liuu et al. |
| 6,870,826 B1 | 3/2005 | Ishizu et al. |
| 6,904,097 B2 | 6/2005 | Agami et al. |
| 6,904,283 B2 | 6/2005 | Li et al. |
| 6,904,550 B2 | 6/2005 | Sibecas et al. |
| 6,907,020 B2 | 6/2005 | Periyalwar et al. |
| 6,907,269 B2 | 6/2005 | Yamaguchi et al. |

(56) References Cited

U.S. PATENT DOCUMENTS

| | | | |
|---|---|---|---|
| 6,909,707 B2 | 6/2005 | Rotstein et al. |
| 6,909,797 B2 | 6/2005 | Romsdahl et al. |
| 6,917,602 B2 | 7/2005 | Toskala et al. |
| 6,917,821 B2 | 7/2005 | Kadous et al. |
| 6,927,728 B2 | 8/2005 | Vook et al. |
| 6,928,047 B1 | 8/2005 | Xia et al. |
| 6,934,266 B2 | 8/2005 | Dulin et al. |
| 6,934,275 B1 | 8/2005 | Love et al. |
| 6,934,340 B1 | 8/2005 | Dollard |
| 6,940,842 B2 | 9/2005 | Proctor, Jr. |
| 6,940,845 B2 | 9/2005 | Benveniste |
| 6,954,448 B2 | 10/2005 | Farley et al. |
| 6,954,481 B1 | 10/2005 | Laroia et al. |
| 6,954,622 B2 | 10/2005 | Nelson et al. |
| 6,961,364 B1 | 11/2005 | Laroia et al. |
| 6,963,543 B2 | 11/2005 | Diep et al. |
| 6,970,682 B2 | 11/2005 | Crilly, Jr. et al. |
| 6,975,868 B2 | 12/2005 | Joshi et al. |
| 6,980,540 B1 | 12/2005 | Laroia et al. |
| 6,985,434 B2 | 1/2006 | Wu et al. |
| 6,985,453 B2 | 1/2006 | Lundby et al. |
| 6,985,466 B1 | 1/2006 | Yun et al. |
| 6,985,498 B2 | 1/2006 | Laroia et al. |
| 6,987,746 B1 | 1/2006 | Song |
| 6,993,342 B2 | 1/2006 | Kuchibhotla et al. |
| 7,002,900 B2 | 2/2006 | Walton et al. |
| 7,006,529 B2 | 2/2006 | Alastalo et al. |
| 7,006,557 B2 | 2/2006 | Subrahmanya et al. |
| 7,006,848 B2 | 2/2006 | Ling et al. |
| 7,009,500 B2 | 3/2006 | Rao et al. |
| 7,010,048 B1 | 3/2006 | Shattil et al. |
| 7,013,143 B2 | 3/2006 | Love et al. |
| 7,016,318 B2 | 3/2006 | Pankaj et al. |
| 7,016,319 B2 | 3/2006 | Baum et al. |
| 7,016,425 B1 | 3/2006 | Kraiem et al. |
| 7,020,110 B2 | 3/2006 | Walton et al. |
| 7,023,880 B2 | 4/2006 | El-Maleh et al. |
| 7,039,356 B2 | 5/2006 | Nguyen |
| 7,039,370 B2 | 5/2006 | Laroia et al. |
| 7,042,856 B2 | 5/2006 | Walton et al. |
| 7,042,857 B2 | 5/2006 | Krishnan et al. |
| 7,047,006 B2 | 5/2006 | Classon et al. |
| 7,050,402 B2 | 5/2006 | Schmidl et al. |
| 7,050,405 B2 | 5/2006 | Attar et al. |
| 7,050,759 B2 | 5/2006 | Gaal et al. |
| 7,054,301 B1 | 5/2006 | Sousa et al. |
| 7,061,898 B2 | 6/2006 | Hashem et al. |
| 7,069,009 B2 | 6/2006 | Li et al. |
| 7,072,315 B1 | 7/2006 | Liu et al. |
| 7,079,867 B2 | 7/2006 | Chun et al. |
| 7,085,574 B2 | 8/2006 | Gaal et al. |
| 7,095,708 B1 | 8/2006 | Alamouti et al. |
| 7,095,709 B2 | 8/2006 | Walton et al. |
| 7,099,299 B2 | 8/2006 | Liang et al. |
| 7,099,630 B2 | 8/2006 | Brunner et al. |
| 7,103,384 B2 | 9/2006 | Chun |
| 7,106,319 B2 | 9/2006 | Ishiyama |
| 7,113,808 B2 | 9/2006 | Hwang et al. |
| 7,120,134 B2 | 10/2006 | Tiedemann, Jr. et al. |
| 7,120,395 B2 | 10/2006 | Tong et al. |
| 7,126,928 B2 | 10/2006 | Tiedemann, Jr. et al. |
| 7,131,086 B2 | 10/2006 | Yamasaki et al. |
| 7,133,460 B2 | 11/2006 | Bae et al. |
| 7,139,328 B2 | 11/2006 | Thomas et al. |
| 7,142,864 B2 | 11/2006 | Laroia et al. |
| 7,145,940 B2 | 12/2006 | Gore et al. |
| 7,145,959 B2 | 12/2006 | Harel et al. |
| 7,149,199 B2 | 12/2006 | Sung et al. |
| 7,149,238 B2 | 12/2006 | Agee et al. |
| 7,151,761 B1 | 12/2006 | Palenius |
| 7,151,936 B2 | 12/2006 | Wager et al. |
| 7,154,936 B2 | 12/2006 | Bjerke et al. |
| 7,155,236 B2 | 12/2006 | Chen et al. |
| 7,157,351 B2 | 1/2007 | Cheng et al. |
| 7,161,971 B2 | 1/2007 | Tiedemann, Jr. et al. |
| 7,164,649 B2 | 1/2007 | Walton et al. |
| 7,164,696 B2 | 1/2007 | Sano et al. |
| 7,167,916 B2 | 1/2007 | Willen et al. |
| 7,170,937 B2 | 1/2007 | Zhou |
| 7,177,297 B2 | 2/2007 | Agrawal et al. |
| 7,177,351 B2 | 2/2007 | Kadous |
| 7,180,627 B2 | 2/2007 | Moylan et al. |
| 7,181,170 B2 | 2/2007 | Love et al. |
| 7,184,426 B2 | 2/2007 | Padovani et al. |
| 7,184,713 B2 | 2/2007 | Kadous et al. |
| 7,188,300 B2 * | 3/2007 | Eriksson et al. ............. 714/790 |
| 7,197,282 B2 | 3/2007 | Dent et al. |
| 7,200,177 B2 | 4/2007 | Miyoshi et al. |
| 7,209,712 B2 | 4/2007 | Holtzman |
| 7,215,979 B2 | 5/2007 | Nakagawa et al. |
| 7,230,942 B2 | 6/2007 | Laroia et al. |
| 7,233,634 B1 | 6/2007 | Hassell Sweatman et al. |
| 7,236,747 B1 | 6/2007 | Meacham et al. |
| 7,242,722 B2 | 7/2007 | Krauss et al. |
| 7,243,150 B2 | 7/2007 | Sher et al. |
| 7,248,559 B2 | 7/2007 | Ma et al. |
| 7,248,841 B2 | 7/2007 | Agee et al. |
| 7,254,158 B2 | 8/2007 | Agrawal |
| 7,257,167 B2 | 8/2007 | Lau |
| 7,257,406 B2 | 8/2007 | Ji et al. |
| 7,257,423 B2 | 8/2007 | Iochi et al. |
| 7,260,153 B2 | 8/2007 | Nissani et al. |
| 7,280,467 B2 | 10/2007 | Smee et al. |
| 7,289,570 B2 | 10/2007 | Schmidl et al. |
| 7,289,585 B2 | 10/2007 | Sandhu et al. |
| 7,290,195 B2 | 10/2007 | Guo et al. |
| 7,292,651 B2 | 11/2007 | Li |
| 7,292,863 B2 | 11/2007 | Chen et al. |
| 7,295,509 B2 | 11/2007 | Laroia et al. |
| 7,313,086 B2 | 12/2007 | Aizawa et al. |
| 7,313,126 B2 | 12/2007 | Yun et al. |
| 7,313,174 B2 | 12/2007 | Alard et al. |
| 7,313,407 B2 | 12/2007 | Shapira et al. |
| 7,327,812 B2 | 2/2008 | Auer et al. |
| 7,330,701 B2 | 2/2008 | Mukkavilli et al. |
| 7,336,727 B2 | 2/2008 | Mukkavilli et al. |
| 7,349,371 B2 | 3/2008 | Schein et al. |
| 7,349,667 B2 | 3/2008 | Magee et al. |
| 7,356,000 B2 | 4/2008 | Oprescu-Surcobe et al. |
| 7,356,005 B2 | 4/2008 | Derryberry et al. |
| 7,356,073 B2 | 4/2008 | Heikkila |
| 7,359,327 B2 | 4/2008 | Oshiba |
| 7,363,055 B2 | 4/2008 | Castrogiovanni et al. |
| 7,366,223 B1 | 4/2008 | Chen et al. |
| 7,366,253 B2 | 4/2008 | Kim et al. |
| 7,366,520 B2 | 4/2008 | Haustein et al. |
| 7,369,531 B2 | 5/2008 | Cho et al. |
| 7,372,911 B1 | 5/2008 | Lindskog et al. |
| 7,372,912 B2 | 5/2008 | Seo et al. |
| 7,379,489 B2 | 5/2008 | Zuniga et al. |
| 7,382,764 B2 | 6/2008 | Uehara et al. |
| 7,392,014 B2 | 6/2008 | Baker et al. |
| 7,394,865 B2 | 7/2008 | Borran et al. |
| 7,403,745 B2 | 7/2008 | Dominique et al. |
| 7,403,748 B1 | 7/2008 | Keskitalo et al. |
| 7,406,119 B2 | 7/2008 | Yamano et al. |
| 7,406,336 B2 | 7/2008 | Astely et al. |
| 7,411,898 B2 | 8/2008 | Erlich et al. |
| 7,412,212 B2 | 8/2008 | Hottinen et al. |
| 7,418,043 B2 | 8/2008 | Shattil et al. |
| 7,418,246 B2 | 8/2008 | Kim et al. |
| 7,423,991 B2 | 9/2008 | Cho et al. |
| 7,426,426 B2 | 9/2008 | Vann Baren et al. |
| 7,428,426 B2 | 9/2008 | Kiran et al. |
| 7,433,661 B2 | 10/2008 | Kogiantis et al. |
| 7,437,164 B2 | 10/2008 | Agrawal et al. |
| 7,443,835 B2 | 10/2008 | Lakshmi Narayanan et al. |
| 7,447,270 B1 | 11/2008 | Hottinen et al. |
| 7,450,532 B2 | 11/2008 | Chae et al. |
| 7,450,548 B2 | 11/2008 | Haustein et al. |
| 7,454,011 B2 | 11/2008 | Lim |
| 7,460,466 B2 | 12/2008 | Lee et al. |
| 7,463,698 B2 | 12/2008 | Fujii et al. |
| 7,468,943 B2 | 12/2008 | Gu et al. |

(56) References Cited

U.S. PATENT DOCUMENTS

| | | |
|---|---|---|
| 7,471,963 B2 | 12/2008 | Kim et al. |
| 7,483,408 B2 | 1/2009 | Bevan et al. |
| 7,483,719 B2 | 1/2009 | Kim et al. |
| 7,486,408 B2 | 2/2009 | Vann Der Schaar et al. |
| 7,486,735 B2 | 2/2009 | Dubuc et al. |
| 7,492,788 B2 | 2/2009 | Zhang et al. |
| 7,499,393 B2 | 3/2009 | Ozluturk et al. |
| 7,508,748 B2 | 3/2009 | Kadous |
| 7,508,842 B2 | 3/2009 | Baum et al. |
| 7,512,096 B2 | 3/2009 | Kuzminskiy et al. |
| 7,545,867 B1 | 6/2009 | Lou et al. |
| 7,548,506 B2 | 6/2009 | Maa et al. |
| 7,551,546 B2 | 6/2009 | Ma et al. |
| 7,551,564 B2 | 6/2009 | Mattina |
| 7,558,293 B2 * | 7/2009 | Choi et al. ............ 370/509 |
| 7,567,621 B2 | 7/2009 | Sampath et al. |
| 7,573,900 B2 | 8/2009 | Kim et al. |
| 7,599,327 B2 | 10/2009 | Zhuang |
| 7,616,955 B2 | 11/2009 | Kim et al. |
| 7,627,051 B2 | 12/2009 | Shen et al. |
| 7,664,061 B2 | 2/2010 | Hottinen |
| 7,676,007 B1 | 3/2010 | Choi et al. |
| 7,684,507 B2 | 3/2010 | Levy |
| 7,724,777 B2 | 5/2010 | Sutivong et al. |
| 7,768,979 B2 | 8/2010 | Sutivong et al. |
| 7,899,497 B2 | 3/2011 | Kish et al. |
| 7,916,624 B2 | 3/2011 | Laroia et al. |
| 7,924,699 B2 | 4/2011 | Laroia et al. |
| 7,990,843 B2 | 8/2011 | Laroia et al. |
| 7,990,844 B2 | 8/2011 | Laroia et al. |
| 8,045,512 B2 | 10/2011 | Khandekar et al. |
| 8,095,141 B2 | 1/2012 | Teague |
| 8,098,568 B2 | 1/2012 | Laroia et al. |
| 8,098,569 B2 | 1/2012 | Laroia et al. |
| 8,199,634 B2 | 6/2012 | Laroia et al. |
| 8,218,425 B2 | 7/2012 | Laroia et al. |
| 8,223,627 B2 | 7/2012 | Laroia et al. |
| 8,446,892 B2 | 5/2013 | Ji et al. |
| 8,462,859 B2 | 6/2013 | Sampath et al. |
| 8,477,684 B2 | 7/2013 | Khandekar et al. |
| 8,582,509 B2 | 11/2013 | Khandekar et al. |
| 8,582,548 B2 | 11/2013 | Gore et al. |
| 8,599,945 B2 | 12/2013 | Sampath |
| 2001/0021650 A1 | 9/2001 | Bilgic et al. |
| 2001/0024427 A1 | 9/2001 | Suzuki |
| 2001/0030948 A1 | 10/2001 | Tiedemann, Jr. |
| 2001/0047424 A1 | 11/2001 | Alastalo et al. |
| 2001/0053140 A1 | 12/2001 | Choi et al. |
| 2001/0055294 A1 | 12/2001 | Motoyoshi |
| 2001/0055297 A1 | 12/2001 | Benveniste et al. |
| 2002/0000948 A1 | 1/2002 | Chun et al. |
| 2002/0015405 A1 * | 2/2002 | Sepponen et al. ............ 370/389 |
| 2002/0018157 A1 | 2/2002 | Zhang et al. |
| 2002/0039912 A1 | 4/2002 | Yamaguchi et al. |
| 2002/0044524 A1 | 4/2002 | Laroia et al. |
| 2002/0058525 A1 | 5/2002 | Kasapi et al. |
| 2002/0061742 A1 | 5/2002 | Lapaille et al. |
| 2002/0077152 A1 | 6/2002 | Johnson et al. |
| 2002/0085521 A1 | 7/2002 | Tripathi et al. |
| 2002/0090004 A1 | 7/2002 | Rinchiuso |
| 2002/0090024 A1 | 7/2002 | Tan |
| 2002/0101839 A1 | 8/2002 | Farley et al. |
| 2002/0122381 A1 | 9/2002 | Wu et al. |
| 2002/0122403 A1 | 9/2002 | Hashem et al. |
| 2002/0128035 A1 | 9/2002 | Jokinen et al. |
| 2002/0147953 A1 | 10/2002 | Catreux et al. |
| 2002/0159422 A1 | 10/2002 | Li et al. |
| 2002/0160769 A1 | 10/2002 | Gray et al. |
| 2002/0160781 A1 | 10/2002 | Bark et al. |
| 2002/0168946 A1 | 11/2002 | Aizawa et al. |
| 2002/0172293 A1 | 11/2002 | Kuchi et al. |
| 2002/0176398 A1 | 11/2002 | Nidda |
| 2002/0181571 A1 * | 12/2002 | Yamano et al. ............ 375/222 |
| 2002/0193146 A1 | 12/2002 | Wallace et al. |
| 2003/0002464 A1 | 1/2003 | Rezaiifar et al. |
| 2003/0020651 A1 | 1/2003 | Crilly, Jr. et al. |
| 2003/0027579 A1 | 2/2003 | Sydon |
| 2003/0035491 A1 | 2/2003 | Walton et al. |
| 2003/0036359 A1 | 2/2003 | Dent et al. |
| 2003/0040283 A1 | 2/2003 | Kawai et al. |
| 2003/0043732 A1 | 3/2003 | Walton et al. |
| 2003/0043764 A1 | 3/2003 | Kim et al. |
| 2003/0063579 A1 | 4/2003 | Lee |
| 2003/0068983 A1 | 4/2003 | Kim et al. |
| 2003/0072254 A1 | 4/2003 | Ma et al. |
| 2003/0072255 A1 | 4/2003 | Ma et al. |
| 2003/0072280 A1 | 4/2003 | McFarland et al. |
| 2003/0072395 A1 | 4/2003 | Jia et al. |
| 2003/0073409 A1 | 4/2003 | Nobukiyo et al. |
| 2003/0073464 A1 | 4/2003 | Giannakis et al. |
| 2003/0076890 A1 | 4/2003 | Hochwald et al. |
| 2003/0086371 A1 | 5/2003 | Walton et al. |
| 2003/0086393 A1 | 5/2003 | Vasudevan et al. |
| 2003/0096579 A1 | 5/2003 | Ito et al. |
| 2003/0103520 A1 | 6/2003 | Chen et al. |
| 2003/0109266 A1 | 6/2003 | Rafiah et al. |
| 2003/0112745 A1 | 6/2003 | Zhuang et al. |
| 2003/0123414 A1 | 7/2003 | Tong et al. |
| 2003/0125040 A1 | 7/2003 | Walton et al. |
| 2003/0128658 A1 | 7/2003 | Walton et al. |
| 2003/0133426 A1 | 7/2003 | Schein et al. |
| 2003/0142648 A1 | 7/2003 | Semper |
| 2003/0142729 A1 | 7/2003 | Subrahmanya et al. |
| 2003/0147371 A1 | 8/2003 | Choi et al. |
| 2003/0161281 A1 | 8/2003 | Dulin et al. |
| 2003/0161282 A1 | 8/2003 | Medvedev et al. |
| 2003/0165189 A1 | 9/2003 | Kadous et al. |
| 2003/0181170 A1 | 9/2003 | Sim |
| 2003/0185310 A1 | 10/2003 | Ketchum et al. |
| 2003/0190897 A1 | 10/2003 | Lei et al. |
| 2003/0193915 A1 | 10/2003 | Lee et al. |
| 2003/0202491 A1 | 10/2003 | Tiedemann, Jr. et al. |
| 2003/0202560 A1 | 10/2003 | Tiedemann, Jr. et al. |
| 2003/0216156 A1 | 11/2003 | Chun et al. |
| 2003/0228850 A1 | 12/2003 | Hwang |
| 2003/0235255 A1 | 12/2003 | Ketchum et al. |
| 2004/0001429 A1 | 1/2004 | Ma et al. |
| 2004/0001460 A1 | 1/2004 | Bevan et al. |
| 2004/0002364 A1 | 1/2004 | Trikkonen et al. |
| 2004/0009783 A1 | 1/2004 | Miyoshi et al. |
| 2004/0010623 A1 | 1/2004 | Sher et al. |
| 2004/0015692 A1 | 1/2004 | Green et al. |
| 2004/0017785 A1 | 1/2004 | Zelst et al. |
| 2004/0042558 A1 | 3/2004 | Hwang et al. |
| 2004/0048609 A1 * | 3/2004 | Kosaka ............ 455/422.1 |
| 2004/0048630 A1 | 3/2004 | Shapira et al. |
| 2004/0054999 A1 | 3/2004 | Willen et al. |
| 2004/0057394 A1 | 3/2004 | Holtzman et al. |
| 2004/0058687 A1 | 3/2004 | Kim et al. |
| 2004/0066754 A1 | 4/2004 | Hottinen et al. |
| 2004/0066761 A1 | 4/2004 | Giannakis et al. |
| 2004/0066772 A1 | 4/2004 | Moon et al. |
| 2004/0067756 A1 | 4/2004 | Wager et al. |
| 2004/0072565 A1 | 4/2004 | Nobukiyo et al. |
| 2004/0076185 A1 | 4/2004 | Kim et al. |
| 2004/0077345 A1 | 4/2004 | Turner et al. |
| 2004/0077379 A1 | 4/2004 | Smith et al. |
| 2004/0081073 A1 | 4/2004 | Walton et al. |
| 2004/0081195 A1 | 4/2004 | El-Maleh et al. |
| 2004/0087325 A1 | 5/2004 | Cheng et al. |
| 2004/0095907 A1 | 5/2004 | Agee et al. |
| 2004/0097215 A1 | 5/2004 | Abe et al. |
| 2004/0097240 A1 | 5/2004 | Chen et al. |
| 2004/0098505 A1 | 5/2004 | Clemmensen et al. |
| 2004/0105489 A1 | 6/2004 | Kim et al. |
| 2004/0114618 A1 | 6/2004 | Tong et al. |
| 2004/0120411 A1 | 6/2004 | Walton et al. |
| 2004/0125792 A1 | 7/2004 | Bradbury et al. |
| 2004/0128605 A1 | 7/2004 | Sibecas et al. |
| 2004/0131007 A1 | 7/2004 | Smee et al. |
| 2004/0131008 A1 | 7/2004 | Zuniga et al. |
| 2004/0131038 A1 | 7/2004 | Kim et al. |
| 2004/0131110 A1 | 7/2004 | Alard et al. |
| 2004/0136344 A1 | 7/2004 | Kim et al. |

(56) References Cited

U.S. PATENT DOCUMENTS

| | | |
|---|---|---|
| 2004/0156328 A1 | 8/2004 | Walton et al. |
| 2004/0160914 A1 | 8/2004 | Sarkar et al. |
| 2004/0160933 A1 | 8/2004 | Odenwalder et al. |
| 2004/0162083 A1 | 8/2004 | Chen et al. |
| 2004/0165564 A1* | 8/2004 | Kim et al. ............... 370/338 |
| 2004/0166867 A1 | 8/2004 | Hawe et al. |
| 2004/0166887 A1 | 8/2004 | Laroia et al. |
| 2004/0170152 A1 | 9/2004 | Nagao et al. |
| 2004/0170157 A1* | 9/2004 | Kim et al. ............... 370/349 |
| 2004/0171384 A1 | 9/2004 | Holma et al. |
| 2004/0171385 A1 | 9/2004 | Haustein et al. |
| 2004/0178954 A1 | 9/2004 | Vook et al. |
| 2004/0179480 A1 | 9/2004 | Attar et al. |
| 2004/0179494 A1 | 9/2004 | Attar et al. |
| 2004/0179506 A1 | 9/2004 | Padovani et al. |
| 2004/0179627 A1 | 9/2004 | Ketchum et al. |
| 2004/0181569 A1 | 9/2004 | Attar et al. |
| 2004/0185792 A1 | 9/2004 | Alexiou et al. |
| 2004/0190640 A1 | 9/2004 | Dubuc et al. |
| 2004/0202257 A1 | 10/2004 | Mehta et al. |
| 2004/0208138 A1 | 10/2004 | Hayashi et al. |
| 2004/0218520 A1 | 11/2004 | Aizawa et al. |
| 2004/0219819 A1 | 11/2004 | Dii Mascio et al. |
| 2004/0219919 A1 | 11/2004 | Whinnett et al. |
| 2004/0224711 A1 | 11/2004 | Panchal et al. |
| 2004/0228267 A1 | 11/2004 | Agrawal et al. |
| 2004/0228313 A1* | 11/2004 | Cheng et al. ............... 370/342 |
| 2004/0229615 A1 | 11/2004 | Agrawal et al. |
| 2004/0240419 A1 | 12/2004 | Abrishamkar et al. |
| 2004/0240572 A1 | 12/2004 | Brutel et al. |
| 2004/0248604 A1 | 12/2004 | Vaidyanathan et al. |
| 2004/0252529 A1 | 12/2004 | Huber et al. |
| 2004/0252629 A1 | 12/2004 | Hasegawa et al. |
| 2004/0252655 A1 | 12/2004 | Lim et al. |
| 2004/0252662 A1 | 12/2004 | Cho |
| 2004/0257979 A1 | 12/2004 | Ro et al. |
| 2004/0264507 A1 | 12/2004 | Cho et al. |
| 2004/0264585 A1 | 12/2004 | Borran et al. |
| 2004/0264593 A1 | 12/2004 | Shim et al. |
| 2005/0002412 A1 | 1/2005 | Sagfors et al. |
| 2005/0002440 A1 | 1/2005 | Alamouti et al. |
| 2005/0002467 A1 | 1/2005 | Seo et al. |
| 2005/0002468 A1 | 1/2005 | Walton et al. |
| 2005/0003782 A1 | 1/2005 | Wintzell |
| 2005/0008091 A1 | 1/2005 | Boutros et al. |
| 2005/0009486 A1 | 1/2005 | Al-Dhahir et al. |
| 2005/0013263 A1 | 1/2005 | Kim et al. |
| 2005/0025093 A1 | 2/2005 | Yun et al. |
| 2005/0030886 A1 | 2/2005 | Wu et al. |
| 2005/0030964 A1 | 2/2005 | Tiedemann et al. |
| 2005/0034079 A1 | 2/2005 | Gunasekar et al. |
| 2005/0041611 A1 | 2/2005 | Sandhu et al. |
| 2005/0041618 A1 | 2/2005 | Wei et al. |
| 2005/0041750 A1 | 2/2005 | Lau et al. |
| 2005/0041775 A1 | 2/2005 | Batzinger et al. |
| 2005/0044206 A1 | 2/2005 | Johansson et al. |
| 2005/0047517 A1 | 3/2005 | Georgios et al. |
| 2005/0052991 A1 | 3/2005 | Kadous |
| 2005/0053081 A1 | 3/2005 | Andersson et al. |
| 2005/0053151 A1 | 3/2005 | Lin et al. |
| 2005/0063298 A1 | 3/2005 | Ling et al. |
| 2005/0068921 A1 | 3/2005 | Liu |
| 2005/0073976 A1 | 4/2005 | Fujii |
| 2005/0085195 A1 | 4/2005 | Tong et al. |
| 2005/0085236 A1 | 4/2005 | Gerlach et al. |
| 2005/0111397 A1 | 5/2005 | Attar et al. |
| 2005/0113100 A1 | 5/2005 | Oprescu-Surcobe et al. |
| 2005/0122898 A1 | 6/2005 | Jang et al. |
| 2005/0128683 A1 | 6/2005 | Watanabe et al. |
| 2005/0128983 A1 | 6/2005 | Kim et al. |
| 2005/0135324 A1 | 6/2005 | Kim et al. |
| 2005/0135498 A1 | 6/2005 | Yee |
| 2005/0141624 A1 | 6/2005 | Lakshmipathi et al. |
| 2005/0147024 A1 | 7/2005 | Jung et al. |
| 2005/0147025 A1 | 7/2005 | Auer et al. |
| 2005/0152484 A1 | 7/2005 | Sandhu et al. |
| 2005/0157807 A1 | 7/2005 | Shim et al. |
| 2005/0159162 A1 | 7/2005 | Park |
| 2005/0164709 A1 | 7/2005 | Balasubramanian et al. |
| 2005/0165949 A1 | 7/2005 | Teague |
| 2005/0174981 A1 | 8/2005 | Heath et al. |
| 2005/0175070 A1 | 8/2005 | Grob et al. |
| 2005/0180311 A1 | 8/2005 | Wang et al. |
| 2005/0180313 A1 | 8/2005 | Kim et al. |
| 2005/0181799 A1 | 8/2005 | Laroia et al. |
| 2005/0192011 A1 | 9/2005 | Hong et al. |
| 2005/0195733 A1 | 9/2005 | Walton et al. |
| 2005/0195852 A1 | 9/2005 | Vayanos et al. |
| 2005/0195886 A1 | 9/2005 | Lampinen et al. |
| 2005/0201296 A1 | 9/2005 | Vannithamby et al. |
| 2005/0204247 A1 | 9/2005 | Guo et al. |
| 2005/0207367 A1 | 9/2005 | Onggosanusi et al. |
| 2005/0215196 A1 | 9/2005 | Krishnan et al. |
| 2005/0215251 A1 | 9/2005 | Krishnan et al. |
| 2005/0226204 A1* | 10/2005 | Uehara ............... 370/349 |
| 2005/0239465 A1 | 10/2005 | Lee et al. |
| 2005/0243791 A1 | 11/2005 | Park et al. |
| 2005/0246548 A1 | 11/2005 | Laitinen |
| 2005/0249266 A1 | 11/2005 | Brown et al. |
| 2005/0254416 A1 | 11/2005 | Laroia et al. |
| 2005/0254467 A1 | 11/2005 | Li et al. |
| 2005/0254477 A1 | 11/2005 | Lee et al. |
| 2005/0254556 A1 | 11/2005 | Fujii et al. |
| 2005/0259005 A1 | 11/2005 | Chiang et al. |
| 2005/0259723 A1 | 11/2005 | Blanchard et al. |
| 2005/0259757 A1 | 11/2005 | Wu et al. |
| 2005/0265220 A1* | 12/2005 | Erlich et al. ............... 370/208 |
| 2005/0265293 A1 | 12/2005 | Ro et al. |
| 2005/0265470 A1 | 12/2005 | Kishigami et al. |
| 2005/0271012 A1 | 12/2005 | Agrawal et al. |
| 2005/0276347 A1 | 12/2005 | Mujtaba et al. |
| 2005/0276348 A1 | 12/2005 | Vandenameele |
| 2005/0277423 A1 | 12/2005 | Sandhu et al. |
| 2005/0281029 A1 | 12/2005 | Inamoto et al. |
| 2005/0281290 A1 | 12/2005 | Khandekar et al. |
| 2005/0282500 A1 | 12/2005 | Wang et al. |
| 2005/0286408 A1 | 12/2005 | Jin et al. |
| 2005/0289256 A1 | 12/2005 | Cudak et al. |
| 2006/0002451 A1 | 1/2006 | Fukuta et al. |
| 2006/0013285 A1 | 1/2006 | Kobayashi et al. |
| 2006/0018336 A1 | 1/2006 | Sutivong et al. |
| 2006/0018347 A1 | 1/2006 | Agrawal |
| 2006/0018397 A1 | 1/2006 | Sampath et al. |
| 2006/0026344 A1 | 2/2006 | Sunn Hsu et al. |
| 2006/0029289 A1 | 2/2006 | Yamaguchi et al. |
| 2006/0034164 A1 | 2/2006 | Ozluturk et al. |
| 2006/0034173 A1 | 2/2006 | Teague et al. |
| 2006/0039332 A1 | 2/2006 | Kotzin |
| 2006/0039344 A1 | 2/2006 | Khan |
| 2006/0039500 A1 | 2/2006 | Yun et al. |
| 2006/0040655 A1 | 2/2006 | Kim et al. |
| 2006/0045003 A1* | 3/2006 | Choi et al. ............... 370/208 |
| 2006/0050770 A1 | 3/2006 | Wallace et al. |
| 2006/0056340 A1 | 3/2006 | Hottinen et al. |
| 2006/0057958 A1 | 3/2006 | Ngo et al. |
| 2006/0067421 A1 | 3/2006 | Walton et al. |
| 2006/0078075 A1 | 4/2006 | Stamoulis et al. |
| 2006/0083159 A1 | 4/2006 | Laroia et al. |
| 2006/0083183 A1 | 4/2006 | Teague et al. |
| 2006/0089104 A1 | 4/2006 | Kaikkonen et al. |
| 2006/0092054 A1 | 5/2006 | Li et al. |
| 2006/0093065 A1 | 5/2006 | Thomas et al. |
| 2006/0104333 A1 | 5/2006 | Rainbolt et al. |
| 2006/0104381 A1 | 5/2006 | Menon et al. |
| 2006/0107171 A1 | 5/2006 | Skraparlis |
| 2006/0109814 A1 | 5/2006 | Kuzminskiy et al. |
| 2006/0111054 A1 | 5/2006 | Pan et al. |
| 2006/0111148 A1 | 5/2006 | Mukkavilli et al. |
| 2006/0114858 A1 | 6/2006 | Walton et al. |
| 2006/0120469 A1 | 6/2006 | Maltsev et al. |
| 2006/0120471 A1 | 6/2006 | Learned et al. |
| 2006/0126491 A1 | 6/2006 | Ro et al. |
| 2006/0133269 A1 | 6/2006 | Prakash et al. |
| 2006/0133455 A1 | 6/2006 | Agrawal et al. |

(56) References Cited

U.S. PATENT DOCUMENTS

| | | |
|---|---|---|
| 2006/0133521 A1 | 6/2006 | Sampath et al. |
| 2006/0140289 A1 | 6/2006 | Mandyam et al. |
| 2006/0153239 A1 | 7/2006 | Julian et al. |
| 2006/0155534 A1 | 7/2006 | Lin et al. |
| 2006/0156199 A1 | 7/2006 | Palanki et al. |
| 2006/0172704 A1 | 8/2006 | Nishio et al. |
| 2006/0189321 A1 | 8/2006 | Oh et al. |
| 2006/0193294 A1 | 8/2006 | Jorswieck et al. |
| 2006/0203708 A1 | 9/2006 | Sampath et al. |
| 2006/0203794 A1 | 9/2006 | Sampath et al. |
| 2006/0203891 A1 | 9/2006 | Sampath et al. |
| 2006/0203932 A1 | 9/2006 | Palanki et al. |
| 2006/0209670 A1 | 9/2006 | Gorokhov et al. |
| 2006/0209732 A1 | 9/2006 | Gorokhov et al. |
| 2006/0209754 A1 | 9/2006 | Ji et al. |
| 2006/0209764 A1 | 9/2006 | Kim et al. |
| 2006/0209973 A1 | 9/2006 | Gorokhov et al. |
| 2006/0215777 A1 | 9/2006 | Krishnamoorthi |
| 2006/0218459 A1 | 9/2006 | Hedberg |
| 2006/0223449 A1 | 10/2006 | Sampath et al. |
| 2006/0233124 A1 | 10/2006 | Palanki et al. |
| 2006/0233131 A1 | 10/2006 | Gore et al. |
| 2006/0233222 A1 | 10/2006 | Reial et al. |
| 2006/0262754 A1 | 11/2006 | Andersson et al. |
| 2006/0270427 A1 | 11/2006 | Shida et al. |
| 2006/0274836 A1 | 12/2006 | Sampath et al. |
| 2006/0280114 A1 | 12/2006 | Osseiran et al. |
| 2006/0285485 A1 | 12/2006 | Agrawal et al. |
| 2006/0285515 A1 | 12/2006 | Julian et al. |
| 2006/0286974 A1 | 12/2006 | Gore et al. |
| 2006/0286982 A1 | 12/2006 | Prakash et al. |
| 2006/0286995 A1 | 12/2006 | Onggosanusi et al. |
| 2006/0291371 A1 | 12/2006 | Sutivong et al. |
| 2006/0292989 A1 | 12/2006 | Gerlach et al. |
| 2007/0004430 A1 | 1/2007 | Hyun et al. |
| 2007/0004921 A1 | 1/2007 | Gorokhov et al. |
| 2007/0005749 A1 | 1/2007 | Sampath |
| 2007/0009011 A1 | 1/2007 | Coulsonn et al. |
| 2007/0019596 A1 | 1/2007 | Barriac et al. |
| 2007/0025345 A1 | 2/2007 | Bachl et al. |
| 2007/0041311 A1 | 2/2007 | Baum et al. |
| 2007/0041404 A1 | 2/2007 | Palanki et al. |
| 2007/0041457 A1 | 2/2007 | Kadous et al. |
| 2007/0047485 A1 | 3/2007 | Gorokhov et al. |
| 2007/0047495 A1 | 3/2007 | Ji et al. |
| 2007/0053282 A1 | 3/2007 | Tong et al. |
| 2007/0053383 A1 | 3/2007 | Choi et al. |
| 2007/0060178 A1 | 3/2007 | Gorokhov et al. |
| 2007/0064669 A1 | 3/2007 | Classon et al. |
| 2007/0070952 A1 | 3/2007 | Yoon et al. |
| 2007/0071147 A1 | 3/2007 | Sampath et al. |
| 2007/0097853 A1 | 5/2007 | Khandekar et al. |
| 2007/0097889 A1 | 5/2007 | Wang et al. |
| 2007/0097908 A1 | 5/2007 | Khandekar et al. |
| 2007/0097909 A1 | 5/2007 | Khandekar et al. |
| 2007/0097910 A1 | 5/2007 | Ji et al. |
| 2007/0097922 A1 | 5/2007 | Parekh et al. |
| 2007/0097927 A1 | 5/2007 | Gorokhov et al. |
| 2007/0097942 A1 | 5/2007 | Gorokhov et al. |
| 2007/0097981 A1 | 5/2007 | Papasakellariou et al. |
| 2007/0098050 A1 | 5/2007 | Khandekar et al. |
| 2007/0098120 A1 | 5/2007 | Wang |
| 2007/0099666 A1 | 5/2007 | Astely et al. |
| 2007/0110172 A1 | 5/2007 | Faulkner et al. |
| 2007/0115795 A1 | 5/2007 | Gore et al. |
| 2007/0149194 A1 | 6/2007 | Das et al. |
| 2007/0149228 A1 | 6/2007 | Das |
| 2007/0159969 A1 | 7/2007 | Das et al. |
| 2007/0160115 A1 | 7/2007 | Palanki et al. |
| 2007/0165738 A1 | 7/2007 | Barriac et al. |
| 2007/0177631 A1 | 8/2007 | Popovic et al. |
| 2007/0177681 A1 | 8/2007 | Choi et al. |
| 2007/0183303 A1 | 8/2007 | Pi et al. |
| 2007/0183386 A1 | 8/2007 | Muharemovic et al. |
| 2007/0207812 A1 | 9/2007 | Borran et al. |
| 2007/0211616 A1 | 9/2007 | Khandekar et al. |
| 2007/0211667 A1 | 9/2007 | Agrawal et al. |
| 2007/0230324 A1 | 10/2007 | Li et al. |
| 2007/0242653 A1 | 10/2007 | Yang et al. |
| 2007/0263743 A1 | 11/2007 | Lee et al. |
| 2007/0280336 A1 | 12/2007 | Zhangg et al. |
| 2007/0281702 A1 | 12/2007 | Lim et al. |
| 2008/0039129 A1 | 2/2008 | Li et al. |
| 2008/0063099 A1 | 3/2008 | Laroia et al. |
| 2008/0095223 A1 | 4/2008 | Tong et al. |
| 2008/0095262 A1 | 4/2008 | Hoo et al. |
| 2008/0151829 A1 | 6/2008 | Khandekar et al. |
| 2008/0181139 A1 | 7/2008 | Rangarajan et al. |
| 2008/0214222 A1 | 9/2008 | Atarashi et al. |
| 2008/0253279 A1 | 10/2008 | Ma et al. |
| 2008/0267157 A1 | 10/2008 | Leee et al. |
| 2008/0299983 A1 | 12/2008 | Kwak et al. |
| 2009/0003466 A1 | 1/2009 | Taherzadehboroujeni et al. |
| 2009/0010351 A1 | 1/2009 | Laroia et al. |
| 2009/0022098 A1 | 1/2009 | Novak et al. |
| 2009/0041150 A1 | 2/2009 | Tsai et al. |
| 2009/0110103 A1 | 4/2009 | Maltsev et al. |
| 2009/0129501 A1 | 5/2009 | Mehta et al. |
| 2009/0180459 A1 | 7/2009 | Orlikk et al. |
| 2009/0197646 A1 | 8/2009 | Tamura et al. |
| 2009/0201826 A1 | 8/2009 | Gorokhov et al. |
| 2009/0201872 A1 | 8/2009 | Gorokhov et al. |
| 2009/0213750 A1 | 8/2009 | Gorokhov et al. |
| 2009/0213950 A1 | 8/2009 | Gorokhov et al. |
| 2009/0262641 A1 | 10/2009 | Laroia et al. |
| 2009/0262699 A1 | 10/2009 | Wengerterr et al. |
| 2009/0285163 A1 | 11/2009 | Zhang et al. |
| 2009/0287977 A1 | 11/2009 | Chang et al. |
| 2010/0002570 A9 | 1/2010 | Walton et al. |
| 2010/0135242 A1 | 6/2010 | Nam et al. |
| 2010/0220800 A1 | 9/2010 | Erell et al. |
| 2010/0232384 A1 | 9/2010 | Farajidana et al. |
| 2010/0238902 A1 | 9/2010 | Ji et al. |
| 2010/0254263 A1 | 10/2010 | Chen et al. |
| 2011/0064070 A1 | 3/2011 | Gore et al. |
| 2011/0235733 A1 | 9/2011 | Laroia et al. |
| 2011/0235745 A1 | 9/2011 | Laroia et al. |
| 2011/0235746 A1 | 9/2011 | Laroia et al. |
| 2011/0235747 A1 | 9/2011 | Laroia et al. |
| 2011/0255518 A9 | 10/2011 | Agrawal et al. |
| 2011/0306291 A1 | 12/2011 | Ma et al. |
| 2012/0002623 A1 | 1/2012 | Khandekar et al. |
| 2012/0063441 A1 | 3/2012 | Palanki |
| 2012/0120925 A1 | 5/2012 | Kadous et al. |
| 2012/0140798 A1 | 6/2012 | Kadous et al. |
| 2012/0140838 A1 | 6/2012 | Kadous et al. |
| 2013/0016678 A1 | 1/2013 | Laroia et al. |
| 2013/0208681 A1 | 8/2013 | Gore et al. |
| 2013/0287138 A1 | 10/2013 | Ma et al. |
| 2013/0315200 A1 | 11/2013 | Gorokhov et al. |
| 2014/0247898 A1 | 9/2014 | Laroia et al. |
| 2014/0376518 A1 | 12/2014 | Palanki et al. |

FOREIGN PATENT DOCUMENTS

| | | |
|---|---|---|
| CA | 2540688 | 5/2005 |
| CA | 2577369 | 3/2006 |
| CL | 14001993 | 12/1994 |
| CL | 8461997 | 1/1998 |
| CL | 95311997 | 1/1998 |
| CL | 27102004 | 8/2005 |
| CL | 22892004 | 9/2005 |
| CL | 29032006 | 10/2005 |
| CL | 30862004 | 10/2005 |
| CL | 29932005 | 5/2006 |
| CL | 29012006 | 10/2006 |
| CL | 29022006 | 10/2006 |
| CL | 29042006 | 10/2006 |
| CL | 29062006 | 10/2006 |
| CL | 29082006 | 10/2006 |
| CL | 15202006 | 12/2006 |
| CL | 22032006 | 2/2007 |
| CL | 15212006 | 3/2007 |
| CL | 14922006 | 4/2007 |

(56) References Cited

FOREIGN PATENT DOCUMENTS

| | | |
|---|---|---|
| CL | 14892006 | 5/2007 |
| CL | 14902006 | 5/2007 |
| CL | 46151 | 12/2009 |
| CL | 29072006 | 1/2010 |
| CN | 1252919 | 5/2000 |
| CN | 1267437 | 9/2000 |
| CN | 1284795 | 2/2001 |
| CN | 1296682 | 5/2001 |
| CN | 1344451 | 4/2002 |
| CN | 1346221 | 4/2002 |
| CN | 1383631 | 12/2002 |
| CN | 1386344 | 12/2002 |
| CN | 1402916 A | 3/2003 |
| CN | 1424835 | 6/2003 |
| CN | 1132474 C | 12/2003 |
| CN | 1467938 A | 1/2004 |
| CN | 1487755 A | 4/2004 |
| CN | 1520220 | 8/2004 |
| CN | 1525678 | 9/2004 |
| CN | 1636346 | 7/2005 |
| CN | 1642051 A | 7/2005 |
| CN | 1642335 A | 7/2005 |
| CN | 1647436 | 7/2005 |
| DE | 1900953 | 7/1999 |
| DE | 19800653 A1 | 7/1999 |
| DE | 1061687 | 12/2000 |
| DE | 19957288 | 5/2001 |
| DE | 10240138 | 8/2003 |
| DE | 10254384 | 6/2004 |
| DE | 1533950 | 5/2005 |
| DE | 2006134032 | 12/2006 |
| EP | 0488976 | 6/1992 |
| EP | 0568291 A2 | 11/1993 |
| EP | 0740431 A1 | 10/1996 |
| EP | 0786889 A1 | 7/1997 |
| EP | 0805576 A2 | 11/1997 |
| EP | 0807989 A1 | 11/1997 |
| EP | 0844796 | 8/1998 |
| EP | 0981222 A2 | 2/2000 |
| EP | 1001570 A2 | 5/2000 |
| EP | 1047209 A1 | 10/2000 |
| EP | 1091516 A1 | 4/2001 |
| EP | 1093241 A1 | 4/2001 |
| EP | 1148673 A2 | 10/2001 |
| EP | 1172983 A2 | 1/2002 |
| EP | 1180907 A2 | 2/2002 |
| EP | 1187506 A1 | 3/2002 |
| EP | 1204217 | 5/2002 |
| EP | 1255369 | 11/2002 |
| EP | 1267513 | 12/2002 |
| EP | 1074099 B1 | 2/2003 |
| EP | 1286490 | 2/2003 |
| EP | 1335504 A2 | 8/2003 |
| EP | 1351538 A1 | 10/2003 |
| EP | 1376920 | 1/2004 |
| EP | 1392073 A1 | 2/2004 |
| EP | 1434365 A2 | 6/2004 |
| EP | 1441469 A2 | 7/2004 |
| EP | 1445873 A2 | 8/2004 |
| EP | 1465449 A1 | 10/2004 |
| EP | 1478204 A2 | 11/2004 |
| EP | 1507421 | 2/2005 |
| EP | 1513356 A2 | 3/2005 |
| EP | 1531575 A2 | 5/2005 |
| EP | 1538863 | 6/2005 |
| EP | 1542488 A1 | 6/2005 |
| EP | 1601149 A2 | 11/2005 |
| EP | 1643669 A1 | 4/2006 |
| EP | 1898542 A1 | 3/2008 |
| EP | 1941693 | 7/2011 |
| FR | 2584884 | 1/1987 |
| GB | 2279540 A | 1/1995 |
| GB | 2348776 | 10/2000 |
| GB | 2412541 | 9/2005 |
| GB | 2412541 A | 9/2005 |
| IL | 167573 | 2/2011 |
| IL | 201872 | 5/2012 |
| JP | H04111544 A | 4/1992 |
| JP | 4301931 | 10/1992 |
| JP | H0746248 A | 2/1995 |
| JP | 7336323 A | 12/1995 |
| JP | 8116329 A | 5/1996 |
| JP | 08288927 | 11/1996 |
| JP | 9008725 A | 1/1997 |
| JP | H09501548 A | 2/1997 |
| JP | 9131342 | 5/1997 |
| JP | 9182148 A | 7/1997 |
| JP | 09214404 | 8/1997 |
| JP | 9284200 A | 10/1997 |
| JP | 10117162 | 5/1998 |
| JP | H10210000 A | 8/1998 |
| JP | 10322304 | 12/1998 |
| JP | H11168453 A | 6/1999 |
| JP | 11191756 A | 7/1999 |
| JP | 11196109 | 7/1999 |
| JP | 11508417 T | 7/1999 |
| JP | 11239155 A | 8/1999 |
| JP | 11298954 | 10/1999 |
| JP | 11331927 A | 11/1999 |
| JP | 2000022618 | 1/2000 |
| JP | 2000102065 A | 4/2000 |
| JP | 2000184425 | 6/2000 |
| JP | 2000511750 A | 9/2000 |
| JP | 2000332724 A | 11/2000 |
| JP | 2001016644 A2 | 1/2001 |
| JP | 2001045573 A | 2/2001 |
| JP | 2001057545 A | 2/2001 |
| JP | 2001156732 A | 6/2001 |
| JP | 2001238269 | 8/2001 |
| JP | 2001245355 A | 9/2001 |
| JP | 2001249802 | 9/2001 |
| JP | 2001285927 A | 10/2001 |
| JP | 2001521698 A | 11/2001 |
| JP | 2001526012 | 12/2001 |
| JP | 2002026790 | 1/2002 |
| JP | 2002111556 A | 4/2002 |
| JP | 2002515203 T | 5/2002 |
| JP | 2002290148 A | 10/2002 |
| JP | 2002534925 A | 10/2002 |
| JP | 2002534941 | 10/2002 |
| JP | 2002538696 A | 11/2002 |
| JP | 200318054 | 1/2003 |
| JP | 2003032218 | 1/2003 |
| JP | 2003500909 | 1/2003 |
| JP | 200369472 | 3/2003 |
| JP | 2003101515 | 4/2003 |
| JP | 2003169367 A | 6/2003 |
| JP | 2003174426 | 6/2003 |
| JP | 2003199173 A | 7/2003 |
| JP | 2003520523 | 7/2003 |
| JP | 2003235072 A | 8/2003 |
| JP | 2003249907 A | 9/2003 |
| JP | 2003292667 A | 10/2003 |
| JP | 2003318857 A | 11/2003 |
| JP | 2003347985 | 12/2003 |
| JP | 2003348047 | 12/2003 |
| JP | 2003536308 A | 12/2003 |
| JP | 2004007643 A | 1/2004 |
| JP | 2004023716 | 1/2004 |
| JP | 2004048716 | 2/2004 |
| JP | 200472457 | 3/2004 |
| JP | 2004072157 A | 3/2004 |
| JP | 2004096142 | 3/2004 |
| JP | 2004507151 A | 3/2004 |
| JP | 2004507950 A | 3/2004 |
| JP | 2004153676 | 5/2004 |
| JP | 2004158901 A | 6/2004 |
| JP | 2004162388 A | 6/2004 |
| JP | 2004194262 A | 7/2004 |
| JP | 2004201296 A | 7/2004 |
| JP | 2004215022 A | 7/2004 |
| JP | 2004221972 | 8/2004 |
| JP | 2004266818 | 9/2004 |
| JP | 2004529524 T | 9/2004 |

(56) References Cited

FOREIGN PATENT DOCUMENTS

| | | | |
|---|---|---|---|
| JP | 2004297276 A | 10/2004 | |
| JP | 2004297370 A | 10/2004 | |
| JP | 2004297756 | 10/2004 | |
| JP | 2004534456 | 11/2004 | |
| JP | 2004535106 A | 11/2004 | |
| JP | 2005006337 | 1/2005 | |
| JP | 2005020530 A | 1/2005 | |
| JP | 2005502218 T | 1/2005 | |
| JP | 2005506757 | 3/2005 | |
| JP | 2005110130 A | 4/2005 | |
| JP | 2005130491 A | 5/2005 | |
| JP | 2005167502 A | 6/2005 | |
| JP | 2005197772 | 7/2005 | |
| JP | 2005203961 | 7/2005 | |
| JP | 2005521327 | 7/2005 | |
| JP | 2005521358 | 7/2005 | |
| JP | 2005236678 A | 9/2005 | |
| JP | 2006505172 | 2/2006 | |
| JP | 2006505230 A | 2/2006 | |
| JP | 2006506860 A | 2/2006 | |
| JP | 2006211537 A | 8/2006 | |
| JP | 2006518173 A | 8/2006 | |
| JP | 2006524930 A | 11/2006 | |
| JP | 2007500486 A | 1/2007 | |
| JP | 2007503790 | 2/2007 | |
| JP | 2007519281 | 7/2007 | |
| JP | 2007525043 T | 8/2007 | |
| JP | 2007527127 | 9/2007 | |
| JP | 2008505587 A | 2/2008 | |
| JP | 2008535398 | 8/2008 | |
| JP | 4188372 B2 | 11/2008 | |
| JP | 2008546314 | 12/2008 | |
| JP | 04694628 B2 | 6/2011 | |
| KR | 0150275 B1 | 11/1998 | |
| KR | 20000060428 | 10/2000 | |
| KR | 100291476 B1 | 3/2001 | |
| KR | 20010056333 | 4/2001 | |
| KR | 20010087715 A | 9/2001 | |
| KR | KR20030007965 | 1/2003 | |
| KR | 20030035969 A | 5/2003 | |
| KR | 20040063057 | 7/2004 | |
| KR | 200471652 | 8/2004 | |
| KR | 20040103441 A | 12/2004 | |
| KR | 20050061559 | 6/2005 | |
| KR | 20050063826 A | 6/2005 | |
| KR | 100606099 | 7/2006 | |
| RU | 95121152 | 12/1997 | |
| RU | 2141168 C1 | 11/1999 | |
| RU | 2141706 C1 | 11/1999 | |
| RU | 2159007 C2 | 11/2000 | |
| RU | 2162275 C2 | 1/2001 | |
| RU | 2183387 C2 | 6/2002 | |
| RU | 2192094 C1 | 10/2002 | |
| RU | 2197778 C2 | 1/2003 | |
| RU | 2201033 C2 | 3/2003 | |
| RU | 2207723 C1 | 6/2003 | |
| RU | 2208913 | 7/2003 | |
| RU | 2210866 C2 | 8/2003 | |
| RU | 2216101 C2 | 11/2003 | |
| RU | 2216103 C2 | 11/2003 | |
| RU | 2216105 C2 | 11/2003 | |
| RU | 2225080 C2 | 2/2004 | |
| RU | 2235429 | 8/2004 | |
| RU | 2235432 | 8/2004 | |
| RU | 2237379 C2 | 9/2004 | |
| RU | 2238611 | 10/2004 | |
| RU | 2242091 C2 | 12/2004 | |
| RU | 2003125268 | 2/2005 | |
| RU | 2285388 | 3/2005 | |
| RU | 2250564 | 4/2005 | |
| RU | 2257008 | 7/2005 | |
| RU | 2267224 | 12/2005 | |
| RU | 2005129079 A | 2/2006 | |
| RU | 2285351 C2 | 10/2006 | |
| RU | RU2285338 C2 | 10/2006 | |
| RU | 2292655 | 1/2007 | |
| RU | 2335864 C2 | 10/2008 | |
| RU | 2349043 C2 | 3/2009 | |
| SU | 1320883 | 6/1987 | |
| TW | 508960 | 11/2002 | |
| TW | 508960 B | 11/2002 | |
| TW | 510132 | 11/2002 | |
| TW | 200302642 | 8/2003 | |
| TW | 200401572 | 1/2004 | |
| TW | 1232040 | 5/2005 | |
| TW | 248266 | 1/2006 | |
| TW | 200718128 | 5/2007 | |
| WO | WO9408432 | 4/1994 | |
| WO | WO9521494 A1 | 8/1995 | |
| WO | WO9613920 A1 | 5/1996 | |
| WO | WO9701256 | 1/1997 | |
| WO | WO9737456 A2 | 10/1997 | |
| WO | WO9746033 A2 | 12/1997 | |
| WO | WO9800946 A2 | 1/1998 | |
| WO | WO9814026 A1 | 4/1998 | |
| WO | WO9837706 A2 | 8/1998 | |
| WO | WO9848581 A1 | 10/1998 | |
| WO | WO9853561 A2 | 11/1998 | |
| WO | WO9854919 A2 | 12/1998 | |
| WO | WO9941871 A1 | 8/1999 | |
| WO | WO9944313 A1 | 9/1999 | |
| WO | WO9944383 A1 | 9/1999 | |
| WO | WO9952250 A1 | 10/1999 | |
| WO | WO9953713 | 10/1999 | |
| WO | WO9959265 A1 | 11/1999 | |
| WO | WO9960729 A1 | 11/1999 | |
| WO | 0004728 | 1/2000 | |
| WO | WO0002397 | 1/2000 | |
| WO | WO0033503 | 6/2000 | |
| WO | 0051389 A1 | 8/2000 | |
| WO | WO0070897 | 11/2000 | |
| WO | WO01001596 | 1/2001 | |
| WO | WO0117125 A1 | 3/2001 | |
| WO | WO0126269 | 4/2001 | |
| WO | WO0139523 A2 | 5/2001 | |
| WO | WO0145300 | 6/2001 | |
| WO | 0148969 | 7/2001 | |
| WO | WO0158054 A1 | 8/2001 | |
| WO | WO0160106 A1 | 8/2001 | |
| WO | 0165637 A2 | 9/2001 | |
| WO | WO0169814 A1 | 9/2001 | |
| WO | 0182544 | 11/2001 | |
| WO | WO0182543 | 11/2001 | |
| WO | WO0189112 A1 | 11/2001 | |
| WO | 0195427 A2 | 12/2001 | |
| WO | WO0193505 | 12/2001 | |
| WO | WO0204936 A1 | 1/2002 | |
| WO | WO0207375 | 1/2002 | |
| WO | 0215432 A1 | 2/2002 | |
| WO | WO0215616 | 2/2002 | |
| WO | 0219746 | 3/2002 | |
| WO | WO0231991 A2 | 4/2002 | |
| WO | WO0233848 A2 | 4/2002 | |
| WO | 0245293 A2 | 6/2002 | |
| WO | 0249306 | 6/2002 | |
| WO | WO0245456 A1 | 6/2002 | |
| WO | WO0249305 | 6/2002 | |
| WO | WO0249385 A2 | 6/2002 | |
| WO | WO02060138 | 8/2002 | |
| WO | WO02065675 | 8/2002 | |
| WO | 02082743 | 10/2002 | |
| WO | WO02082689 A2 | 10/2002 | |
| WO | WO02089434 A1 | 11/2002 | |
| WO | WO02093782 A1 | 11/2002 | |
| WO | WO02093819 A1 | 11/2002 | |
| WO | WO02100027 A1 | 12/2002 | |
| WO | 03001696 | 1/2003 | |
| WO | WO03001696 A2 | 1/2003 | |
| WO | WO03001761 A1 | 1/2003 | |
| WO | WO03001981 A2 | 1/2003 | |
| WO | WO03003617 A2 | 1/2003 | |
| WO | WO03019819 | 3/2003 | |
| WO | WO03030414 | 4/2003 | |
| WO | WO03034644 A1 | 4/2003 | |

(56) References Cited

FOREIGN PATENT DOCUMENTS

| | | |
|---|---|---|
| WO | WO03043262 | 5/2003 |
| WO | WO03043369 | 5/2003 |
| WO | 03049409 A2 | 6/2003 |
| WO | WO03058871 A1 | 7/2003 |
| WO | 03069816 A2 | 8/2003 |
| WO | WO0306832 A1 | 8/2003 |
| WO | WO03067783 | 8/2003 |
| WO | WO03073646 | 9/2003 |
| WO | WO03075479 | 9/2003 |
| WO | WO03085876 | 10/2003 |
| WO | WO03088538 A1 | 10/2003 |
| WO | WO03094384 | 11/2003 |
| WO | WO03103331 | 12/2003 |
| WO | WO2004002047 A1 | 12/2003 |
| WO | WO2004004370 | 1/2004 |
| WO | WO2004008671 | 1/2004 |
| WO | WO2004008681 A1 | 1/2004 |
| WO | WO2004015912 | 2/2004 |
| WO | WO2004016007 | 2/2004 |
| WO | WO2004021605 A1 | 3/2004 |
| WO | WO2004023834 A1 | 3/2004 |
| WO | 2004028037 A1 | 4/2004 |
| WO | WO2004030238 A1 | 4/2004 |
| WO | WO2004032443 A1 | 4/2004 |
| WO | 2004038984 A2 | 5/2004 |
| WO | 2004040827 | 5/2004 |
| WO | WO2004038954 | 5/2004 |
| WO | WO2004038972 A1 | 5/2004 |
| WO | WO2004038988 A2 | 5/2004 |
| WO | WO2004040690 A2 | 5/2004 |
| WO | WO2004047354 | 6/2004 |
| WO | WO2004049618 A1 | 6/2004 |
| WO | WO2004051872 A2 | 6/2004 |
| WO | 2004056022 A2 | 7/2004 |
| WO | WO2004062255 | 7/2004 |
| WO | WO2004064294 | 7/2004 |
| WO | WO2004064295 | 7/2004 |
| WO | WO2004066520 | 8/2004 |
| WO | WO2004068721 A2 | 8/2004 |
| WO | WO2004073276 A1 | 8/2004 |
| WO | WO2004075023 | 9/2004 |
| WO | WO2004075442 | 9/2004 |
| WO | WO2004075448 | 9/2004 |
| WO | WO2004075468 | 9/2004 |
| WO | WO2004075596 | 9/2004 |
| WO | WO2004077850 A2 | 9/2004 |
| WO | WO2004084509 | 9/2004 |
| WO | 2004086711 | 10/2004 |
| WO | WO2004086706 A1 | 10/2004 |
| WO | 2004095851 | 11/2004 |
| WO | 2004098072 | 11/2004 |
| WO | WO2004095730 A1 | 11/2004 |
| WO | WO2004095854 | 11/2004 |
| WO | WO2004098222 | 11/2004 |
| WO | WO2004102815 | 11/2004 |
| WO | WO2004102816 A2 | 11/2004 |
| WO | 2004114564 A1 | 12/2004 |
| WO | 2004114615 A1 | 12/2004 |
| WO | WO2004105272 A1 | 12/2004 |
| WO | WO2004114549 | 12/2004 |
| WO | WO2005002253 A1 | 1/2005 |
| WO | 2005015941 | 2/2005 |
| WO | WO2005011163 A1 | 2/2005 |
| WO | WO2005015795 A1 | 2/2005 |
| WO | WO2005015797 A1 | 2/2005 |
| WO | WO2005015810 | 2/2005 |
| WO | WO2005020488 A1 | 3/2005 |
| WO | WO2005020490 | 3/2005 |
| WO | WO2005022811 A2 | 3/2005 |
| WO | WO2005025110 A2 | 3/2005 |
| WO | WO2005032004 A1 | 4/2005 |
| WO | WO2005043780 A1 | 5/2005 |
| WO | WO2005043855 | 5/2005 |
| WO | WO2005046080 | 5/2005 |
| WO | 2005005527 | 6/2005 |
| WO | 2005055465 A1 | 6/2005 |
| WO | WO2005055484 A1 | 6/2005 |
| WO | WO2005060192 A1 | 6/2005 |
| WO | 2005065062 | 7/2005 |
| WO | WO2005069538 A1 | 7/2005 |
| WO | WO2005074184 | 8/2005 |
| WO | 2005086440 A1 | 9/2005 |
| WO | 2005096538 | 10/2005 |
| WO | WO2005122628 | 12/2005 |
| WO | 2006007292 A2 | 1/2006 |
| WO | WO2006019710 | 2/2006 |
| WO | 2006026344 | 3/2006 |
| WO | WO2006044487 | 4/2006 |
| WO | 2006062356 A1 | 6/2006 |
| WO | WO2006069300 | 6/2006 |
| WO | WO2006069397 | 6/2006 |
| WO | WO2006077696 | 7/2006 |
| WO | WO2006096784 A1 | 9/2006 |
| WO | WO2006099349 A1 | 9/2006 |
| WO | WO2006099545 A1 | 9/2006 |
| WO | WO2006099577 A1 | 9/2006 |
| WO | WO2006127544 A2 | 11/2006 |
| WO | 2006138196 | 12/2006 |
| WO | 2006138573 | 12/2006 |
| WO | WO2006138581 A2 | 12/2006 |
| WO | 2007022430 A2 | 2/2007 |
| WO | WO2007024934 | 3/2007 |
| WO | WO2007024935 A2 | 3/2007 |
| WO | WO2007025160 | 3/2007 |
| WO | WO2007051159 A2 | 5/2007 |

OTHER PUBLICATIONS

Written Opinion—PCT/US06/060328, International Search Authority—European Patent Office—Mar. 30, 2007.
International Preliminary Report on Patentability—PCT/US06/060328, The International Bureau of WIPO—Geneva, Switzerland—Apr. 29, 2008.
Digital cellular telecommunications system (Phase 2+); Mobile radio interface layer 3 specification (GSM 04.08 version 7,,7.1 Release 1998); ETSI EN 300 940 V7.7.7 (Oct. 2000), pp. 1,2,91-93.
Favre et al: "Self-Adaptive Transmission Procedure"IBM Technical Disclosure Bulletin, IBM Corporation, Sep. 1976, vol. 19, No. 4, pp. 1283-1284, New York, New York.
Groe, et al., "CDMA Mobile Radio Design," Sep. 26, 2001, Artech House, Norwood, MA 02062, pp. 257-259.
Laroia, R. et al: "An integrated approach based on cross-layer optimization—Designing a mobile broadband wireless access network" IEEE Signal Processing Magazine, IEEE Service Center, Piscatawa, NJ, US, vol. 21, No. 5, Sep. 2004, pp. 20-28, XP011118149.
Lau, et al., "On the Design of MIMO Block-Fading Channels wit Feedback-Link Capacity Constraint," IEEE Transactions on Communications, IEEE Service Center, Piscataway, NJ, US, v. 52, No. 1, Jan. 2004, pp. 62-70, XP00189908.
Lettieri et al: "Adaptive frame length control for improving wireless link throughput, range, and energy efficiency", INFOCOM 98, 17th Annual Joint Conference of the IEEE Computer and Communications Societies, Mar. 29-Apr. 2, 1998, pp. 564-571, vol. 2, IEEE San Francisco, CA, New York, New York.
Molisch, et al., MIMO systems with antenna selection, IEEE Microwave Magazine, URL:http://ieeexplore.ieee.org/iel5/6668/26677/01284943.pdf, Retrieved on Dec. 8, 2006, pp. 46-56 (2004).
Tomcik, J.; "QFDD Technology Overview Presentation,"IEEE 802.20 Working Group on Mobile Broadband Wireless Access, Slides/pp. 1-73, Nov. 15, 2005.
Tomcik, J.; "MBFDD and MBTDD Wideband Mode: Technology Overview," IEEE 802.20 Working Group Mobile Broadband Wireless Access, Jan. 2006, pp. 1-109, XP002429968.
Toufik I et al., "Channel allocation algorithms for multi-carrier systems", Vehicular Technology Conference, 2004, VTC2004-FALL, 2004 IEEE 60th Los Angeles, CA, USA, Sep. 26-29, 2004, pp. 1129-1133, XP010786798, ISBN: 07-7803-8521-7.
Tia-1121.001 "Physical Layer for Ultra Mobile Broadband (UMB) Air Interface Specification," 3GPP2 C.S0084-001-0. Version 2.0 (Aug. 2007).

(56) References Cited

OTHER PUBLICATIONS

Tia-1121.002 "Medium Access Control Layer for Ultra Mobile Broadband (UMB) Air Interface Specification," 3GPP2 C S0084-002-0, Version 2.0 (Aug. 2007).
Das, Arnab, et al. "Adaptive, asynchronous incremental redundancy (A-IR) with fixed transmission time intervals TTI for HSDPA." IEEE, pages 10-83-1087.
3GPP TS 33.220 V.1.1.0 XX,XX, 3rd Generation Partnership Project;
Technical Specification Group Services and Systems Aspects; Generic Authentication Architecture (GAA); Generic Bootstrapping Architecture (Release 6) Feb. 9, 2004, pp. 1-17, figure 4, XP002996023.
Blum, R. et al: "On Optimum MIMO with Antenna Selection," IEEE International Conference on Communications: Conference Procreedings, vol. 1, Apr. 28, 2002, pp. 386-390.
Catreux, S. et al.: "Simulation results for an interference-limited multiple input multiple output cellular system," Global Telecommuncations Conference, 2000. GLOBECOM '00. IEEE. Dec. 1, 2000. vol. 2, pp. 1094-1096, http://ieeexplore.ieee.org/ie15/7153/19260/00891306.pdf?tp=&isnumber=19260&arnumber=8913063&punumber=7153.
Chiani, et al. "Outage Evaluation for Slow Frequency-Hopping Mobile Radio Systems" IEEE Transactions on Communications, vol. 47, No. 12, Dec. 1999, pp. 1865-1874.
Chung, S. et al.: "Low complexity algorithm for rate and power quantization in extended V-BLAST"VTC Fall 2001. IEEE 54th. Vehicular Technology Conference Proceedings. Atlantic City, NJ, Oct. 7-11, 2001, vol. 1 of 4, pp. 910-914, Conf. 54.
Dierks, et al., "The TLS Protocol", Version 1.0, Network Working Group, Request for Comments 2246, pp. 1-80 (Jan. 1999).
El Gamal, H. et al.: "Universal Space-Time Coding," IEEE Transactions on Information Theory, vol. 49, Issue 5, pp. 1097-1119, XP011074756, ISSN: 0018-9448, May 2003.
Hochwald, B. et al., "Achieving near-capacity on a multiple-antenna channel," IEEE Transactions on Communications, IEEE Service Center, Piscataway, New Jersey, vol. 51, No. 3, pp. 389-399 (2003).
Jim Tomcik Qualcomm Incorporated: "QFDD Technology Overview Presentation", IEEE 802.00 Working Group on Mobile Broadband Wireless Access, [Online] Nov. 15, 2005, pp. 1-73, XP002467626.
Kiessling, M. et al., "Short-term and long-term diagonalization of correlated MIMO chennels with adaptive modulation" IEEE International Symposium on Personal, Indoor and Mobile Radio Communcations, vol. 2, Sep. 15, 2002, pp. 593-597.
Kousa, M. et al: "Adaptive Binary Coding for Diversity Communication Systems" IEEE International Conference on Personal Wireless Communications Proceedings, pp. 80-84, XP000992269, (1997).
Maniatis, I. et al., "Pilots for joint channel estimation in multi-user OFDM mobile radio systems," Spread Spectrum Tecniques and Applications, 2002 IEEE Seventh International Symposium, Sep. 2, 2002, pp. 44-48, XP010615562.
Nokia, "Uplink Considerations for UTRA LTE", 3GPP TSG RAN WG1#40bus, Beijing, CN, R1-050251, 3GPP, Apr. 4, 2005, pp. 1-9.
NTT DoCoMo, "Downlink Multiple Access Scheme for Evolved UTRA", 3GPP R1-050249, 3GPP, Apr. 4, 2005, pp. 1-8.
Prasad, N. et al.: "Analysis of Decision Feedback Detection for MIMO Rayleigh Fading Channels and Optimum Allocation of Transmitter Powers and QAM Constellations," pp. 1-10, 39th Annual Conference on Comm. Control and Comput., Monticello, IL Oct. 2001.
Quallcomm Europe: "Description and link simulations for OFDMA based E-UTRA uplink" #GPP Draft; R1-051100, 3rd Generation Partnership Project (3GPP), Mobile Competence Centre; Sophia-Antipolis Cedex, France, vol. RAN WG1, No. San Diego, USA, 20051004, Oct. 4, 2005, pp. 1-10, XP050100715.
S. Nishimura et al., "Downlink Nullforming by a Receivin Antenna Selection for a MIMO/SDMA Channel", Technical Search Report of Electric Information Communication Academic Conference, Feb. 28, 2002, vol. 101, No. 683, pp. 17-22, RCS 2001-286.
Schnell et al., "Application of IFDMA to Mobile Radio Transmission", IEEE 1998 International Conference on Universal Personal Communcations, vol. 2, Oct. 5-9, 1998, pp. 1267-1272.
Wang et al., "Improving performance of multi-user OFDM systems using bit-wise interleaver" Electronics Letters IEE Stevenage, GB, vol. 37. No. 19, Sep. 13, 2001, pp. 1173-1174 XP006017222.
Widdup, B. et al., "A highly-parallel VLSI architecture for a list sphere detector," IEEE International Conference, Paris, France, vol. 5, pp. 2720-2725 (2004).
Wiesel, A. et al.: "Efficient impementation of sphere demodulation" Signal Processing Advances in Wireless Communications, 2003, SPAWC 2003, 4th IEEE Workshop on Rome. Italy Jun. 15-18, 2003, Piscataway, NJ, USA, IEEE, US, Jun. 15, 2003, pp. 36-40, XP010713463.
Yun et al., "Performance of an LDPC-Coded Frequency-Hopping QFDMA System Based on Resource Allocation in the Uplink" Vehicular Technology—Conference 2004, VTO 2004-Spring, 2004 IEEE 59th Milan, Italy May 17-19, 2004, Piscataway, NJ, USA, vol. 4, May 17, 2004, pp. 1925-1928. XP010766497.
John B. Groe, Lawrence E. Larson, "CDMA Mobile Radio Design" Sep. 26, 2001, Artech House, Norwood, MA02062 580530 XP002397967, pp. 157-159.
Kappes, J.M., and Sayegh, S.I., "Programmable Demultiplexer/Demodulator Processor," COMSAT Laboratories, IEEE, 1990, pp. 230-234.
NTT DOCOMO, et al.: "Orthogonal Common Pilot Channel and Scrambling Code in Evolved UTRA Downlink," 3GPP TSG RAN WG1 #42 on LTE, pp. 1-8, (Aug.-Sep. 2005).
TIA/EIA/IS-2000 "Standards for CDMA2000 Spread Spectrum Systems" Version 1.0 Jul. 1999.
TIA/EIA/IS-95 "Mobile Station-Base Station Compatibility Standard for Dual-Mode Wideband Spread Spectrum Cellular System" Jul. 1993.
3rd Generation Partnership Project; Technical Specification Group Radio Access Network;Physical Layer Aspects for Evolved UTRA (Release 7), 3GPP TR 25.814 vO. 3.1 (2005-11).
B. Sklar: "The process of thus correcting the channel-induced distortion is called equalization", Digital Communications, PTR Prentice Hall, Upper Saddle River, New Jersey, 1998, Formatting and Baseband Transmission, Chap. 2, Section 2.11.1, pp. 104-105.
Bahai, Saltzberg: "System Architecture," Multi-Carrier Digital Communications, Kluwer Academic, New York, NY, XP-002199501, 1999, pp. 17-21.
Bingham: "Other Types of MCM," ADSL, VDSL, and Multicarrier Modulation, John Wiley & Sons, New York, XP-002199502, 2000, pp. 111-113.
Carl R. Nassar, Balasubramaniam Natarajan and Steve Shattil: Introduction of Carrier Interference to Spread Spectrum Multiple Access, Apr. 1999, IEEE, pp. 1-5.
Chennakeshu, et al. "A Comparison of Diversity Schemes for a Mixed-Mode Slow Frequency-Hopped Cellular System," IEEE, 1993, pp. 1749-1753.
Chennakeshu, et al. "Capacity Analysis of A TDMA-Based Slow-Frequency-Hopped Cellular System," IEEE Transaction on Vehicular Technology, vol. 45, No. Aug. 3, 1996, pp. 531-542.
Chiani, et al. "Outrage Evaluation for Slow Frequency-Hopping Mobile Radio Systems" IEEE Transactions on Communications, vol. 47, No. 12, pp. 1865-1874, Dec. 1999.
Choi, et al., "Design of the Optimum Pilot Pattern for Channel Estimation on OFDM Systems," Global Telecommunications Conference, IEEE Communications Society, Globecom, Dallas, Texas (2004), pp. 3661-3665.
Czylwik: "Comparison Between Adaptive OFDM and Single Carrier Modulation with Frequency Domain Equalization," IEEE 47th Vehicular Technology Conference, vol. 2, May 4-7, 1997, pp. 865-869.
Das, et al. "On The Reverse Link Interference Structure for Next Generation Cellular Systems," European Microwave Conference, Oct. 11, 2004, pp. 3068-3072.
Dinis, et al., "A Multiple Access Scheme for the Uplink of Broadband Wireless Systems,"IEEE Global Telecommunicaions Conference, 2004, GLOBECOM '04, vol. 6, Nov. 29,-Dec. 3, 2004, pp. 3808-3812.

(56) References Cited

OTHER PUBLICATIONS

Fuchs, et al., "A Novel Tree-Based Scheduling Algorithm for the Downlink of Multi-User MIMO Systems with ZF Beamforming," IEEE International Conference on Acoustics, Speech, and Signal Processing, 2005, Procreedings, Philadelphia, PA. pp. 1121-1124.

Hermann Rohling et al., "Performance Comparison of Different Multipble Access Schemes for the Downlink of an OFDM Communication System", Vehicular Technology Conference, 1997, 47th IEEE, vol. 3, May 4-7, 1997, pp. 1365-1369.

Hill, et al., "Cyclic Shifting and Time Inversion of Partial Transmit Sequences to Reduce the Peak-to-Average Power Radio of OFDM," IEEE International Symposium on Personal, Indoor and Mobile Radio Communications, vol. 2, Sep. 18, 2000, Piscataway, NJ, pp. 1256-1259.

J.S. Chow and J.M. Cioffi: "A cost-effective maximum likelihood reciever for multicarrier systems", Proc. IEEE Int. Conf. on Comm., pp. 948-952, Jun. 1992.

Je, et al. "A Novel Multipble Access Scheme for Uplink Cellular Systems," IEEE Vehicular Technology Conference, Sep. 26, 2004, pp. 984-988.

Kaleh: "Chennel Equalization for Block Transmission Systems," IEEE Journal on Selected Areas in Communications, vol. 13, No. 1, Jan. 1995, pp. 110-121.

Karsten Bruninghaus et al., "Multi-Carrier Spread Spectrum and It's relationship to Single-Carrier Transmission", Vehicular technology Conference, 1998, VTC 98, 48th IEEE, vol. 3, May 18-21, 1998, pp. 2329-2332.

Keller, et al.: "Adaptive Multicarrier Modulation: A Convenient Framework for Time-Frequency Processing in Wireless Communications," Proceedings of the IEEE, vol. 88, No. 5, May 2000, pp. 611-640.

Kim, et al. "Performance of TDMA System with SFH and 2-BIT Differntially Detected GMSK Over Rayleigh Fading Channel," IEEE Vehicular Technology Conference, Apr. 28, 1996, pp. 789-193.

Kishiyama et al., Investigation of optimum pilot channle structure for VSF-OFCDM broadband wireless access in forward link, VTC 2003-Spring, The 57th IEEE Semiannual Vehicular Technology Conference, Proceedings JEJU, Korea, Apr. 22-25, 2003, pp. 139-144.

Kostic, et al. "Dynamic Frequency Hopping in Wireless Cellular Systems-Simulations of Full-Replacement and Reduced-Overhead Methods," IEEE Vehicular Technology Conference, May 16, 1999, pp. 914-918.

Kostic, et al, "Fundamentals of Dynamic Frequency Hopping In Cellular Systems," IEEE Journal on Selected Areas In Communications, vol. 19, No. 11, Nov. 2001, pp. 2254-2266.

Lacroix, et al.: "A Study of OFDM Parameters for High Data Rate Radio LAN's," 2000 IEEE 51st Vehicular Technology Conference Proceedings, vol. 2, May 15-18, 2000, pp. 1075-1079.

Leon, et al., "Cyclic Delay Diversity for Single Carrier-Cyclic Prefix Systems," Conference Record of the Thirty-Ninth Asilomar Conference on Signals, Systems and Communications, Oct. 28, 2005, Piscataway, NJ, pp. 519-523.

Lott: "Comparison of Frequency and Time Domain Differential Modulation in an OFDM System for Wireless ATM," 1999 IEEE 49th Vehicular Technology Conference, vol. 2, Jul. 1999, pp. 877-883.

Mignone, et al.: "CD3-OFDM: A New Channel Estimation Method to Improve the Spectrum Efficiency in Digital Terrestrial Television Systems," International Broadcasting Convention, Sep. 14-18, 1995 Conference Publication No. 413, IEE 1995, pp. 122-128.

Naofal Al-Dhahir: "A Bandwidth-Optimized Reduced-Complexity Equalized Multicarrier Transceiver", IEEE Transactions on Communications, vol. 45, No. 8, Aug. 1997.

Naofal Al-Dhahir: "Optimum Finite-Length Equalization for Multicarrier Transceivers", IEEE Trans. On Comm., pp. 56-64, Jan. 1996.

Nassar, Carl. R., et al., "High Performance MC-CDMA via Carrier Interferometry Codes", IEEE Transactions on Vehicular Technology, vol. 50, No. 6, Nov. 2001.

Sari, et al., "Transmission Techniques for Digital Terrestrial TV Broadcasting," IEEE Communications Magazine, Feb. 1995, pp. 100-109.

Schnell, et al, "Application of IFDMA to Mobile Radio Transmission," IEEE 1998 International Conference on Universal Personal Communications, vol. 2, Oct. 5-9, 1998, pp. 1267-1272.

Schenell, et al., "A Promising New Wideband Multiple-Access Scheme for Future Mobile Communications Systems," European Transactions on Telecommunications, Wiley & Sons, Chichester, GB vol. 10, No. 4, Jul. 1999, pp. 417-427.

Shattil et al., "Array Control Systems for Multicarrier Protocols Using a Frequency-Shifted Feedback Cavity", IEEE, 1999.

Sklar: "Formatting and Baseband Transmission", Chapter 2, pp. 54, 104-106.

Sorger U. et al., : "Interleave FDMA-a new spread-spectrum multipble-access scheme", IEEE Int. Conference on Atlanta, GA, USA Jun. 7-11, 1998, XP010284733.

Tellado, "Multicarrier Modulation with Low Par," Kluwer Academic, Dordrecht, NL, XP-002199500, 2000, pp. 6-11 and 55-60.

Tellambura, "Use of m-sequences for OFDM Peak-to-Average Power Ratio Reduction," Electronics Letters, vol. 33, No. 15, Jul. 17, 1997, pp. 1300-1301.

Torrieri, "Cellular Frequency-Hopping CDMA Systems," IEEE Vehicular Technology Conference, May 16, 1999, pp. 919-925.

Xiaodong, et al., "M-Sequences for OFDM Peak-to-Average Power Ratio Reduction and Error Correction," Electronics Letters, vol. 33, Issue 7, Mar. 27, 1997, pp. 554-555.

Zekri, et al., "DMT Signals with Low Peak-to-Average Power Ratio," Proceedings, IEEE International Symposium on Computers and Communications, 1999, Jul. 6-8, 1999, pp. 362-368.

"European Search Report—EP10011743, Search Authority—Munich Patent Office, Dec. 20, 2010".

"European Search Report—EP10012081, Search Authority—Munich Patent Office, Dec. 17, 2010".

"European Search Report—EP10012082, Search Authority—Munich Patent Office, Dec. 20, 2010".

"European Search Report—EP10012083, Search Authority—Munich Patent Office, Dec. 30, 2010".

Guo, K. et al.: "Providing end-to-end Qos for multimedia applications in 3G wireless networks," Proceedings vol. 5242, SPIE ITCom 2003 Conf. Internet Multimedia Management Systems IV, Nov. 26, 2003, pp. 1-14, DOI: 10.1117/12.514061.

Sumii, Kenji et al.: "A Study on Computational Complexity Reduction of Iterative Decoding for Turbo-coded MIMO-SDM Using Sphere Decoding," Technical Report of IEICE. RCS, Nov. 9, 2010, vol. 104, No. 675, pp. 43-48.

Taiwanese Search Report—095139893—TIPO—Dec. 30, 2010.

Tomcik, T.: "QTDD Performance Report 2," IEEE C802.20-05/88, IEEE 802.20 Working Group on Mobile Broadband Wireless Access, <http://ieee802.org/20/>, pp. 1-56, XP002386798 (Nov. 15, 2005).

Translations of Office Action in Chinese Application 2006800295980 corresponding to U.S. Appl. No. 11/260,895, citing CN1346221 and CN1383631 dated Feb. 16, 2011.

Translation of Office Action in Japan application 2008-538193 corresponding to U.S. Appl. No. 11/261,065, citing JP11196109, JP10322304 and JP9008725 dated Mar. 8, 2011.

Translation of Office Action in Korean application 10-2007-7031029 corresponding to U.S. Appl. No. 11/260,931, citing US20030202491 and KR20040063057 dated Jan. 28, 2011.

Translation of Office Action in Canadian application 2625987 corresponding to U.S. Appl. No. 11/261,065, citing CA2577369 dated Apr. 12, 2011.

Translations of Office Action in Chinese application 200680040236.1 corresponding to U.S. Appl. No. 11/261,065, citing US20040048609 and CN1402916 dated Feb. 18, 2011.

Translation of Office Action in Chinese application 200680048265.2 corresponding to U.S. Appl. No. 11/261,931, citing US6904097, WO04095851, CN1344451 dated Jan. 26, 2011.

Translation of Office Action in Chinese application 200680048832.4 corresponding to U.S. Appl. No. 11/261,158, citing CN1132474 dated Dec. 31, 2010.

(56) References Cited

OTHER PUBLICATIONS

Translation of Office Action in Japanese Application 2008-514880 corresponding to U.S. Appl. No. 11/445,377, citing JP2007519281 and JP2006505172 dated Nov. 9, 2010.
Translation of Office Action in Japanese application 2008-528103 corresponding to U.S. Appl. No. 11/260,924, citing JP2005502218, JP2004534456, JP2003348047, JP2003199173, JP2004529524, JP11508417, JP2001238269, JP2005130491 and JP2003500909 dated Feb. 8, 2011.
Translation of Office Action in Japanese Application 2008-529216 corresponding to U.S. Appl. No. 11/261,159, citing GB2348776, WO2004098222,WO2005065062 and WO2004102815.Dated Jan. 11, 2011.
Translation of Office Action in Japanese application 2008-538181 corresponding U.S. Appl. No. 11/511,735, citing WO04064295, JP2002515203, JP8288927, JP7336323 and JP200157545 dated Jan. 25, 2011.
Voltz P. J., "Characterization of the optimum transmitter correlation matrix for MIMO with antenna subset selection", IEEE Transactions on Communications, vol. 51, pp. 1779-1782, (Nov. 1, 2003).
Yongmei Dai,; Sumei Sun; Zhongding Lei; Yuan Li,: "A List Sphere Decoder based turbo reciever for groupwise space time trellis coded (GSTTC) systems, " 2004 IEEE 59th Vehicular Technology Conference, vol. 2, pp. 804-808, May 17, 2004, doi: 10.1109/VETECS. 2004.1388940.
Sklar, B., "The process of thus correcting the channel-induced distortion is called equalization", Digital Communications, PTR Prentice Hall, Upper Saddle River, New Jersey, 1998, Formatting and Baseband Transmission, Chap. 2, Section 2.11.2, pp. 104-106.
Dammann, A. et al., "Beamforming in Combination with Space-Time Diversity for Broadband OFDM Systems", ICC 2002. 2002 IEEE International Conference on Communications. Apr. 28-May 2, 2002, pp. 165-171, XP010589479.
Viswanath P et al: "Opportunistic beamforming using dumb antennas" IEEE Transactions on Information Theory IEEE USA, vol. 48, No. 6, Jun. 2002, pp. 1277-1294, XP002314708 ISSN: 0018-9448 abstract right-hand column, paragraph 1.
Alcatel-Lucent, et al., "Dedicated Reference Signals for Precoding in E-UTRA Downlink" 3GPP Draft; R1-071718, 3rd Generation Partnership Project (3GPP), Mobile Competence Centre; 650; Route Des Lucioles; F-06921 Sophia-Antipolis Cedex; France, vol. RAN WG1, No. St. Julian; 20070403, Apr. 3, 2007, XP050105640 [retrieved on Apr. 3, 2007].
Bengtsson, M. et al, "A Generalization of Weighted Subspace Fitting to Full-Rank Models", IEEE Transactions on Signal Processing, IEEE Service Center, New York, NY, US vol. 49, No. 5, pp. 1002-1012, May 1, 2001.
Ken Murakami et al., "Status Toward Standardization at IEEE 802. 3ah and items on the construction of GE-PON system," Technical Report of the Institute of Electronics, Information and Communication Engineers, Jun. 13, 2003, vol. 103, No. 124, pp. 1-6, IN2003-24.
Physical Channels and Multiplexing in Evolved UTRA Downlink TSG-RAN Working Group 1 Meeting, XX, XX, vol. R1-050590, Jun. 20, 2005, pp. 1-24, XP003006923 the whole document.
Siemens, "Evolved UTRA uplink scheduling and frequency reuse" [online], 3GPP TSG-RAN WG1 # 41 R1-050476, Internet <URL:http://www.3gpp.org/ftp/tsg_ran/WG1_RL1/TSGR1_41/Docs/R1-050476.zip>, May 9, 2005.
Yatawatta, S. et al., "Energy Efficient Channel Estimation in MIMO Systems", 2005 IEEE International Conference on Acoustics, Speech, and Signal Processing, Mar. 18-23, 2005, Philadelphia, vol. 4, pp. 317-320, Mar. 18, 2005.

Anonymous: "3GPP TS 36.211 V8.0.0; Evolved Universal Terrestrial Radio Access (E-UTRA); Physical channels and modulation (Release 8)" 3rd Generation Partnership Project; Technical Specification Group Radio Access Network, [Online] 2007, XP002520076 Retrieved from the Internet: URL:http://www.Sgpp.org/ftp/Specs/html-info/36211.htm> [retrieved on Sep. 27, 2007] Section 5.
Bhushan N., "UHDR Overview", C30-20060522-037, Denver, CO, May 22, 2006, pp. 1-115.
Jim Tomcik, QFDD and QTDD: Technology Overview, IEEE 802.00 Working Group on Mobile Broadband Wireless Access, Oct. 28, 2005, pp. 48-50, URL, http://www.IEEE802.org/20/contribs/C802.20-05-68.ZIP.
Nokia: "Compact signalling of multi-code allocation for HSDPA", version 2, 3GPP R1-02-0018, Jan. 11, 2002.
Samsung: "Uplink Transmission and Multiplexing for EUTRA", 3GPP DRAFT; R1-050605 UL Multiplexing, Jun. 16, 2005, XP050111420.
Sethi M, et al., "Code Reuse DS-CDMA-A Space Time Approach", Proceedings of the 2002 IEEE International Conference on Acoustics, Speech, and Signal Processing (ICASSP), pp. 2297-2300, May 13-17, 2001.
Tachikawa (Editor); "W-CDMA Mobile Communication Systems," John Wiley & Sons Ltd., Japan, Maruzen: pp. 82-213, Jun. 25, 2001.
Miorandi D., et al., "Analysis of master-slave protocols for real-time industrial communications over IEEE 802.11 WLANS" Industrial Informatics, 2004. INDIN '04, 2nd IEEE International Conference on Berlin, Germany Jun. 24-26, 2004. Piscataway, NJ, USA IEEE, Jun. 24, 2004, pp. 143-148, XP010782619, ISBN 0789385136, Para 3, point B.
LG Electronics "PAPR comparison of uplink MA schemes", 3GPP TSG RAN WG1 Meeting #41, R1-050475, May 9-13, 2005, pp. 6.
Motorola, "Uplink Numerology and Frame Structure", 3GPP TAG RAN1 #41 Meeting R1-050397, May 13, 2005.
Samsung Electronics Co. Ltd.; "Uplink Multiple Access and Multiplexing for Evolved UTRA", R1-050439, May 3, 2005, pp. 1-22, XP55018616, Retrieved from the Internet: URL:http://www.3gpp.org/ftp/tsg_ran/WG1_R1/TSGR1/DOCS/ [retrieved on Feb. 7, 2012].
Digital cellular telecommunications system (Phase 2+); General Packet Radio Service (GPRS); Mobile Station (MS)-Base Station System (BSS)interface; Radio Link Control/Medium Access Control (RLC/MAC) protocol (GSM 04.60 version 8.4.1 Release 1999), 3GPP Standard; ETSI EN 301 349, 3rd Generation Partnership Project (3GPP), Mobile Competence Centre; 650, Route Des Lucioles; F-06921 Sophia-Antipolis Cedex; France, No. V8.4.1, Oct. 1, 2000, pp. 1-243, XP050358534.
Tomcik J., "QFDD and QTDD: Proposed Draft Air Interface Specification," IEEE C802.20-05/69, IEEE 802.20 Working Group on Mobile Broadband Wireless Access, Oct. 28, 2005, P.1-6,1-7,1-16,6-65,7-11,7-33,7-37~7-55,9-22,9-24~9-32.
Institute for Infocomm Research et al., "Intra-Node B Macro Diversity based on Cyclic Delay Transmissions", 3GPP TSG RAN WG1 #42 on LTE, R1-050795, Aug. 29-Sep. 2, 2005, pp. 1-5.
Sommer D. et al., "Coherent OFDM transmission at 60 GHz", Vehicular Technology Conference, 1999, VTC 1999—Fall, IEEE VTS 50th Amsterdam, Netherlands Sep. 19-22, 1999, Piscataway, NJ, USA, IEEE, US, vol. 3, Sep. 19, 1999, pp. 1545-1549, XP010353222, DOI: 10.1109/VETECF.1999.801553, ISBN: 978-0-7803-5434-7.
Zhang H., "A new space-time-frequency MIMO-OFDM scheme with cyclic delay diversity", Frontiers of Mobile and Wireless Communication, 2004. Proceedings of the IEEE 6th Circuits and Systems Symposium on vol. 2, Jun. 2, 2004, pp. 647-650.

* cited by examiner

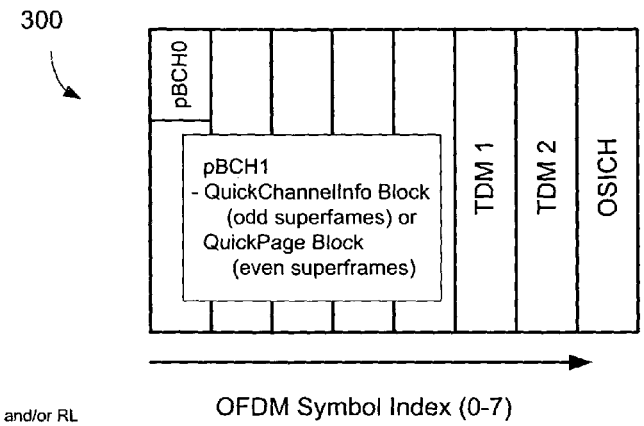
Upon AP detecting the FL and/or RL structure has been altered or this the first time this sector is activated, process 400 is executed.
FIG 3
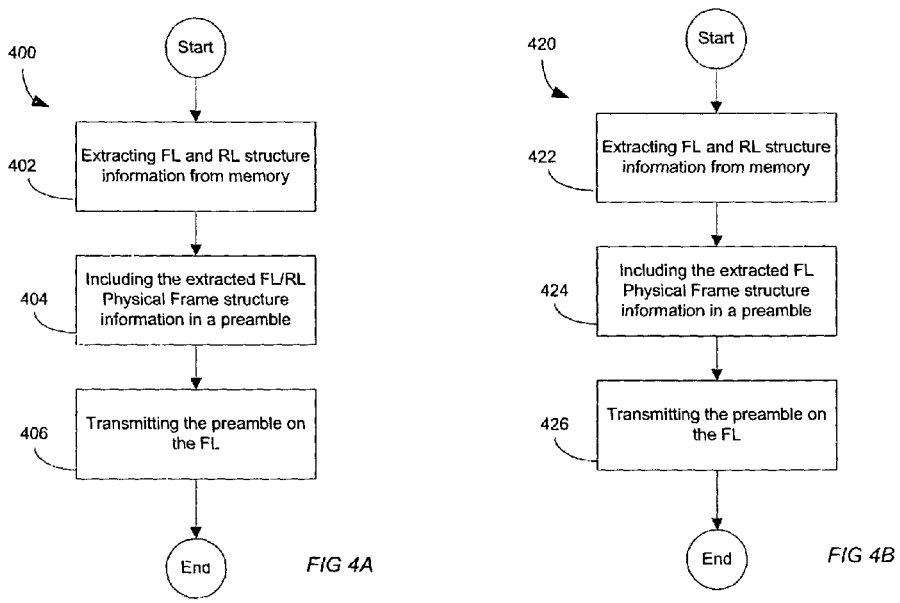
FIG 4A
FIG 4B

METHOD AND APPARATUS FOR BOOTSTRAPING INFORMATION IN A COMMUNICATION SYSTEM

REFERENCE TO CO-PENDING APPLICATIONS FOR PATENT

The present Application for Patent is related to the following co-pending U.S. patent Applications:

Provisional Application No. 60/731,013, entitled, "MOBILE WIRELESS ACCESS SYSTEM", filed concurrently herewith, assigned to the assignee hereof and expressly incorporated by reference herein.

FIELD OF INVENTION

The present description relates generally to a bootstrap technique, more particularly, bootstrapping information/parameters on a forward link in manner that allows an access terminal to determine the structure of the forward communication link and reverse communication link in a communication system.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems.

Generally, a wireless multiple-access communication system can simultaneously support communication for multiple wireless access terminals (ATs). Each AT communicates with one or more base stations via transmissions on the forward and reverse links. The forward link (or downlink) refers to the communication link from the base stations to the ATs, and the reverse link (or uplink) refers to the communication link from the ATs to the base stations.

There are many possible configuration of the forward link (FL) and reverse link (RL) structure. In order for an AT to start utilizing the full capabilities of a system, the AT must have some knowledge of how the FL and RL are configured. In an OFDMA system, there are many possible configurations of the FL and RL structure. Such as number of guard carries, sub-carriers, number of pilots, etc. Without the FL/RL structure information/parameters, the AT either coming into a new sector or waking up on new sector will not be able receive any information on the FL/RL physical channels. One possible way to solve the problem would be to provide a set of known configurations to the AT and have the AT maintain these configurations in memory. However, the total amount of configuration parameters needed could require a large amount of storage on the AT device. However, even if the AT had the capability to store the required configuration parameters, there would be significant issues when the operator desired to change/modify the configuration throughout all or part of their network. For any new base station or any base station with an new configuration The AT would have to search exhaustively through all the configuration possibilities in order to set up a communication link. Alternatively, the owner of the AT could download the new configuration from another information network or physically go to the operator of system to get the updated the configurations. Therefore there is need for a convenient method of providing FL and RL structure to the AT without requiring time-consuming exhaustive search by the AT. Further, such a solution should enable the network operator to make configuration changes in the network as needed without compromising performance of the AT or placing undue burden on the owner of the AT.

BRIEF SUMMARY

In an aspect, an apparatus comprises plurality of electronic devices, each having a logic, wherein the apparatus is configured for receiving a preamble comprising at least one physical frame structure parameter; and determining a FL physical frame structure by using said received physical frame structure parameter.

In an aspect, an apparatus comprises plurality of electronic devices, each having a logic, wherein the apparatus is configured for receiving a FL physical frame comprising at least one RL physical frame structure parameter; and determining a RL physical frame structure by using said RL physical frame structure parameter.

A more complete appreciation of all the advantages and scope of the aspects can be obtained from the accompanying drawings, the description and the appended claims.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein:

FIG. 3 illustrates a superframe preamble structure; and

FIG. 4A illustrates a process executed by the access point;

FIG. 4B illustrates a process executed by the access point; and

DETAILED DESCRIPTION

Figure 1:
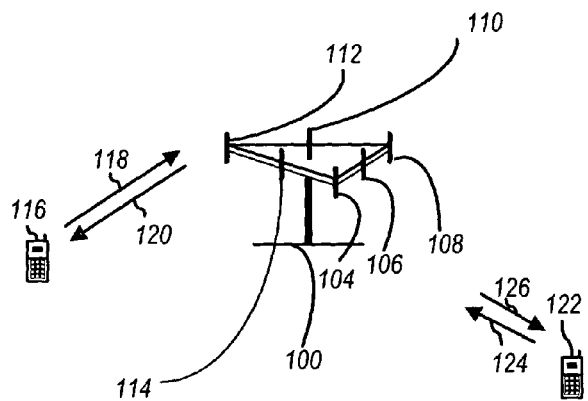
FIG. 1 illustrates a multiple access wireless communication system according to one aspect.

Referring to FIG. 1, a multiple access wireless communication system according to one aspect is illustrated. A access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. In some aspects, an access point 100 comprises a traffic radio unit, one or more high power amplifiers, a central processor, one or more transmitter, one or more transmitter, one or more microwave antennas, fiber optic multiplexers, and Internet protocol switch for networking, one more memory modules and one more combiners.

Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124.

Each group of antennas and/or the area in which they are designed to communicate is often referred to as a sector of the access point. In an aspect, antenna groups each are designed to communicate to access terminals in a sector, of the areas covered by access point 100.

A access point may be a fixed station used for communicating with the terminals and may also be referred to as base station, a Node B, or some other terminology. A access terminal may also be called mobile station, a user equipment (UE), a wireless communication device, terminal, access terminal or some other terminology.

Figure 2:
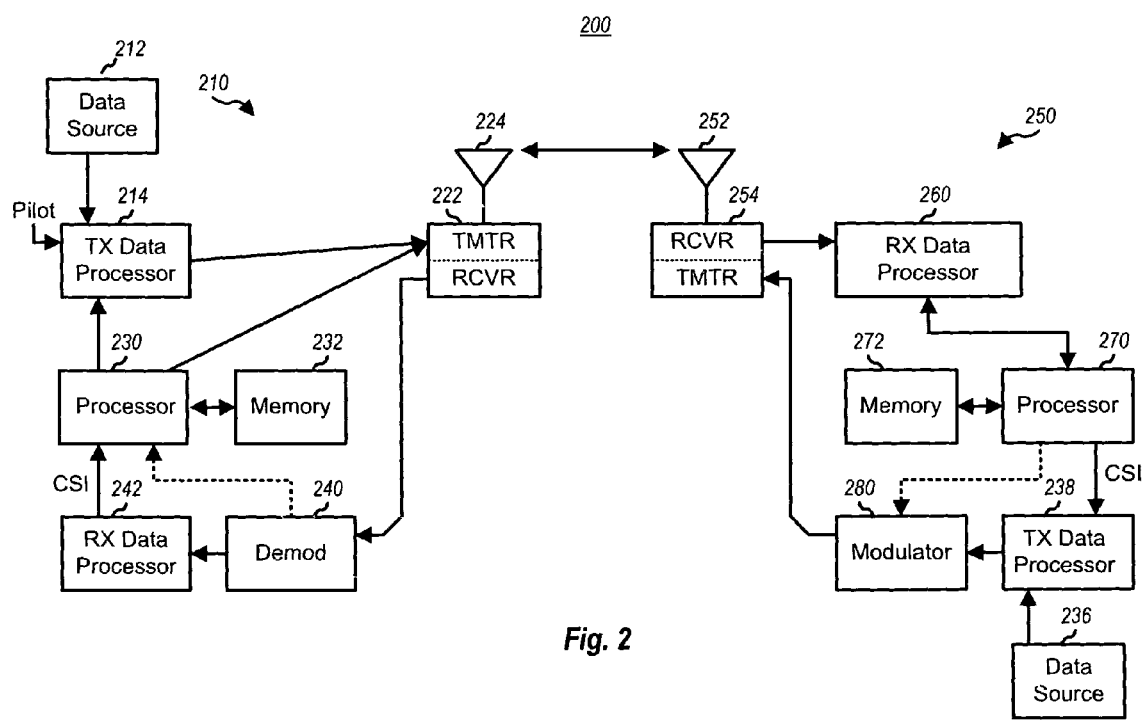
FIG. 2 a block diagram of a communication system.

FIG. 2 is a block diagram of an aspect of a transmitter system 210 (also known as the access point) and a receiver system 250 (also known as access terminal) in a communication system 200. At the transmitter system 210, traffic data for a number of data streams is provided from a data source 212 to a transmit (TX) data processor 214.

In an aspect, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to Transmitter (TMTR) 222. Each transmitter 222 receives and processes a respective symbol stream to provide one or more analog signals, and further conditions (e.g., amplifies, filters, and upconverts) the analog signals to provide a modulated signal suitable for transmission over a channel. The modulated signals from transmitters are then transmitted from antenna 224.

At receiver system 250, the transmitted modulated signals are received by antenna 252 and the received signal from each antenna 252 is provided to a receiver (RCVR) 254. The receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the received symbol streams from receiver 254 based on a particular receiver processing technique to provide the "detected" symbol streams. The RX data processor 260 then demodulates, deinterleaves, and decodes each detected symbol stream to recover the traffic data for the data stream. The processing by RX data processor 260 is complementary to that performed by TX Data processor 214 at transmitter system 210.

Upon entering a new sector or during a wake up sequence, the processor 270 determines FL structure and RL structure by executing process 300, described below. The reverse link message is then processed by a TX data processor 238, which also receives traffic data for a number of data streams from a data source 236, modulated by a modulator 280, conditioned by transmitter 254, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250.

In an aspect, a forward link and a reverse link are used to communicate between the AP and AT. The forward link comprises a preamble and a plurality of FL Physical frames. The reverse link comprises a plurality of RL Physical frames. In an aspect, the structure of RL and FL Physical Frame is variable and thus can be modified by the system operator to optimize the performance of the system. Without the knowledge of the FL/RL structure, the AT will not be able receive any information on the FL Physical Frames nor transmit any information the RL Physical Frames. The structure of the preamble is not variable and known to both AP and AT that operated in system according to the aspect. Typically, the preamble comprises information regarding broadcast channels, overhead messages, TDM pilot information, etc. The AT is required to know FL/RL structure at awake up time, when entering a new sector, or when currently serving sector indicates a different FL/RL structure to use. A bootstrap mechanism according to an aspect is employed whereby the AP will provide information in the preamble (a non-variable or fix structure portion of FL) that will allow the AT to determine the FL/RL Physical structure (variable structure portion). Alternatively, the AT can provide information about the FL structure in the preamble and RL structure parameters in the FL Physical frame. Once the AT determines the FL physical frame structure and decodes the FL physical frame, the AT can extract the RL physical frame structure from FL physical frame.

The forward link transmission is divided into units of superframes. A superframe shall consist of a superframe preamble followed by a series of FL PHY Frames. FIG. 3 illustrates a superframe preamble structure. The superframe preamble 300 carries an overhead channels for example in the first 5 symbols, a common pilot channel (F-CPICH), a broadcast channel (F-pBCH), an acquisition channel (F-ACQCH), and an interference channel (F-OSICH). The F-CPICH that includes pilots that may be used for channel estimation by access terminals and F-pBCH that includes configuration parameters that the access terminal may utilize to demodulate the parameters contained in the forward link frames. In addition, it may include information for paging information. In some aspects, it may contain parameters for the timing of the frames contained in a given superframe. The F-ACQCH that may include timing and other parameters sufficient for an access terminal to communicate on one of the carriers and the F-OSICH may be used for power control at the access terminal.

The last three OFDM symbols in the superframe preamble (the symbols indexed 5 through 7) are time division multiplex (TDM) pilots which are used for initial acquisition. These symbols will also be referred to TDM pilot 1, TDM pilot 2 and TDM pilot 3. The first two of these form the FL Acquisition Channel (F-ACQCH), while the last is reused in order to transmit the FL Other Sector Interference Channel (F-OSICH). The system supports a large number of unique PN codes (total number is 4096) in order to simplify PN planning requirements. Each sector is identified by a number between 0 and 4095 called the PilotPN, and the PN-planning needs to be such that no two sectors with the same PilotPN are observable at any location.

In order to reduce acquisition complexity, while still maintaining a large number of PN codes, a hierarchical pilot structure is used. Therefore, TDM pilot 1 is scrambled using only 2 bits of information (i.e., takes on 4 possible values). TDM pilot 2 is scrambled using 8 bits of information (i.e., takes on 256 possible values), 2 of which are the same ones used to scramble TDM pilot 1. Finally, TDM pilot 3 is scrambled using 12 bits of information, which enables us to distinguish 4096 different PilotPN values. Moreover, TDM 1 is a periodiodic pilot (consisting of two periods), and can hence be detected using a low complexity delayed correlation. The delayed correlation can reduce the initial number of time-hypotheses dramatically, as well as aid in frequency synchronization.

The first five OFDM symbols in the superframe preamble are used to carry the two FL Primary Broadcast Channels, namely F-pBCH0 and F-pBCH1. These channels carry configuration parameters that the AT needs to have before it can demodulate the FL PHY Frames.

An F-pBCH0 packet is encoded over 16 superframes, and occupies approximately ¼ of an OFDM symbol in each superframe preamble. This channel therefore has an extremely small overhead. An F-pBCH1 packet is encoded over a single superframe and occupies approximately 4¾ OFDM symbols in each superframe preamble. The bandwidth overhead of this channel is approximately 2%.

In some aspects, the overhead message comprises a System Info Block (SIB), Quick Channel Info Block (QCIB), and Extended Channel Info Message (ECIM). The System Info Block is transmitted over the F-pBCH0 channel in the superframe preamble. It contains information that is expected to be constant over an entire deployment or a large group of sectors. The parameters it carries include the cyclic prefix duration, the number of guard carriers etc. In addition, it also carries the 12 LSBs of the superframe index.

The Quick Channel Info Block is transmitted over the F-pBCH1 channel in the superframe preamble, more specifically in superframes with odd numbered superframe index. It contains configuration parameters that may enable an AT to demodulate other channels that are transmitted in the PHY Frames or may enable an idle-mode AT to demodulate pages that may be transmitted in the PHY Frames. It is desirable that the AT be able to demodulate these pages even if it wakes up in a new sector, and hence this information may be transmitted with a high periodicity by the AP.

The Extended Channel Info Message contains additional configuration parameters related to FL and RL structure. This includes parameters related to RL configuration as well as parameters related to transmission of FL power control bits. The Extended Channel Info message comprises of several groups for example Power Control group, the Sector Information group etc. This message is transmitted like a regular data channel in predefined superframes, using a broadcast MAC ID.

In certain aspects, other orders of the symbols in superframe may not be as described above. Further, more less of the symbols may be utilized to provide the some or all of the above described information types. The names of the provided symbols are only for information purposes and may vary.

In an aspect, the FL physical frame comprises the following channels. A Forward Acquisition Channel (F-ACQCH), which carries an acquisition pilot for an access terminal to use to acquire the system. A Forward Auxiliary Pilot Channel (F-AuxPICH) which carries auxiliary pilots. The F-pBCH1 indicates whether the F-AuxPICH is present. A Forward Common Pilot Channel (F-CPICH) which carries the common pilot. A Forward Data Channel (F-DCH), which carries information for a specific access terminal. A Forward Data Channel assignment is assigned to an access terminal by a Forward Shared Signaling Channel (F-SSCH) assignment. Also carries broadcast information including pages and sector specific messages. Forward Dedicated Pilot Channel (F-DPICH), which carries the dedicated pilot wherein the F-pBCH0 may indicate whether the F-DPICH is present. A Forward Shared Signaling Channel (F-SSCH), which carries forward and reverse link data channel assignments, access grants, power control commands, and acknowledgement information for Reverse Data Channel (R-DCH) transmissions.

In an aspect, the RL physical frame comprises the following channels. Reverse Access Channel (R-ACH) is used by access terminals to initiate communication with the access network. The Reverse Access Channel is also used by access terminals to obtain timing corrections. Reverse Acknowledgement Channel (R-ACKCH), which carries acknowledgement information of the F-DCH reception. Reverse Beam Feedback Channel (R-BFCH), which carries information about the beam index and the quality of the forward link channel. Reverse Channel Quality Indicator Channel (R-CQICH), which carries information about the quality of the forward link channel of a sector as received by an access terminal. The Reverse Channel Quality Indicator Channel also carries information about the desired forward link serving sector. Reverse Data Channel (R-DCH), which carries information from an access terminal. The Reverse Data Channel is assigned to an access terminal by the F-SSCH assignment. Reverse Pilot Channel (R-PICH), which carries the pilot. Reverse Request Channel (R-REQCH), which carries information about the buffer level at different quality of service classes for an access terminal. The Reverse Request Channel also carries information about the desired revere link serving sector. Reverse Subband Feedback Channel (R-SFCH), which carries information about the quality of a subband or segment of the forward link channel.

It should be noted that the channels described above need not be utilized and may be omitted. Further, other channels may be utilized in addition to, or in lieu of, any of the above described channels.

In aspect, both the FL and RL Physical frames structure can be varied based the parameters/value used for chip rate, bandwidth, length of guard carriers, number of guard carriers, or cyclic prefix. For example, a system may be deployed using chip rate maybe 4.9152, 9.8304 or 19.6608 Mcps. Also, the bandwidth may be approximately 5 MHz, approximately 10 MHz or approximately 20 MHz. Additionally, the guard carries are function of the bandwidth and vary number of guard carriers vary base on system requirements.

FIG. 4A illustrates a process 400 according to an aspect which is executed by the AP processor 230. Upon AP detecting the FL and/or RL structure has been altered or this the first time this sector is activated, process 400 is executed. At block 402, a parameter extracting logic is executed by the processor 230 for extracting FL and RL structure parameters from memory. Even though this FL/RL structure can be altered, the optimized structures are stored in memory, for example 232. At block 404, the processor 230 executes logic to generate the preamble by including the extracted FL/RL Physical Frame structure parameters in a preamble. Thereafter, at block 406, a transmit logic is executed by the processor 230 for transmitting the preamble and the FL Physical frames.

FIG. 4B illustrate a process 420 according to an alternate aspect which is executed by the AP's processor 230. At block 422, an parameter extracting logic is executed by the processor 230 for extracting FL and RL structure parameters from storage medium, for example memory 232. At block 424, the processor 230 executes logic for generating a preamble by including only the extracted FL Physical Frame structure parameters in a preamble. The RL structure parameters may be incorporated into data that will be sent over the FL Physical Frame. At block 426, a transmit logic is executed by the processor 230 for transmitting the preamble and the FL Physical frames. According to the alternate aspect, the AP demodulates the parameters received on one ore more the FL Physical frames and extracts the RL Physical Frame structure.

Figure 5:
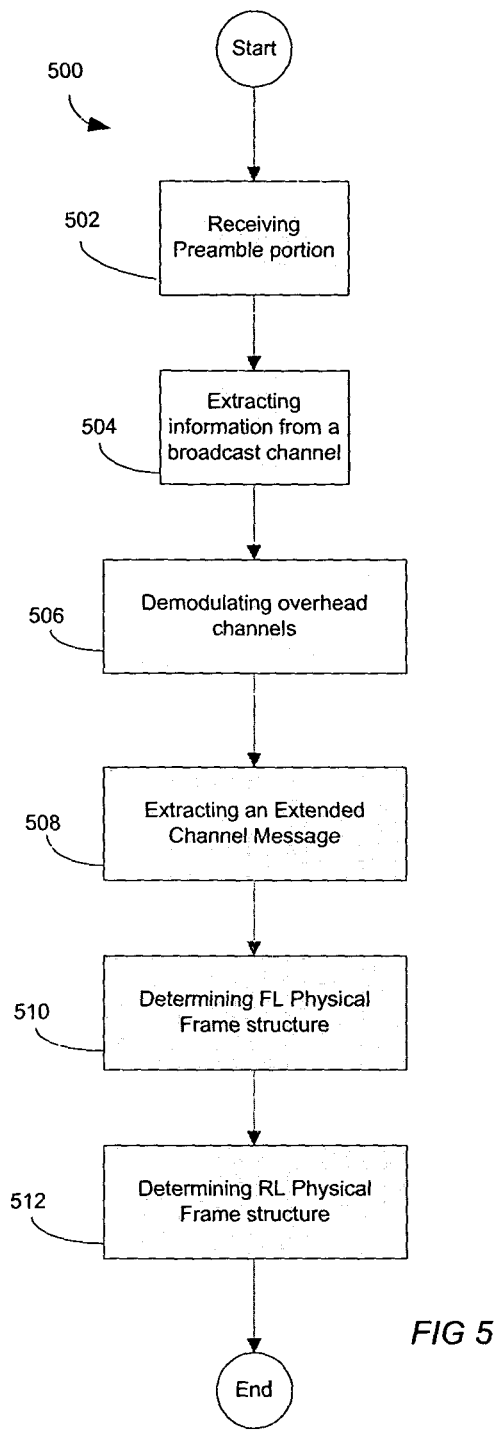
FIG. 5 illustrates a process executed by access terminal.

FIG. 5 illustrates a process 500, executed by AT's processor 270. This process is executed upon AT executing a wake up logic, AT entering a new sector, or AT receiving an indication that FL/RL structure has changed. At block 502, the receiving preamble logic is executed by processor 270 for receiving a preamble portion on the FL. At block 504, extracting parameter logic is executed by the processor for extracting parameters from one or more of the broadcast channels. In an aspect, the F-pBCH0 and pBCH1 of the preamble are extracted. At block 506, demodulating logic is executed by processor 270 for demodulating one or more overhead channels using the parameters extracted from one or more of the broadcast channels. At block 508, extracting logic is executed by the processor 270 for extracting an Extended Channel Message. In an aspect, the Extended Channel Message is used to provide parameters regarding the FL Physical Frame structure. Depending on the deployment of the system, the Extended Channel Message may also comprise the RL Physical Frame Structure.

At block 510, a determining logic is executed by the processor 270 for determining the FL Physical Frame structure. For example extracting portion of the Extended Channel Message to determine how the FL Physical Frame structure is set up. At block 512, a determining logic is executed by the processor 270 for determining the RL Physical Frame structure. For example, if the RL Physical Frame structure parameters is incorporated in the Extended Channel Message, then extracting portion of the Extended Channel Message to determine how the RL Physical Frame structure is set up. In an aspect, a portion of the Extended Channel Message may indicate that RL Physical Frame structure parameters will be provided using the FL Physical Channels. Then AP then will demodulate the FL Physical Frames as normal and determine the RL Physical Frame Structure from parameters received on one or more the FL Physical channels.

The techniques described herein may be implemented by various means. For example, these techniques may be implemented in hardware, software, or a combination thereof. For a hardware implementation, the processing units (e.g., processor 230 and 270, TX and RX processors 214 and 260, and so on) for these techniques may be implemented within one or more electronic devices such as application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, using instructions stored on a machine-readable medium, for example, the techniques described herein may be implemented with modules (e.g., procedures, functions, and so on) that perform the functions described herein. The software codes may be stored in memory units (e.g., memory 232 and 272 in FIG. 2) and executed by processors (e.g., controllers 230). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed aspects is provided to enable any person skilled in the art to make or use the present aspect. Various modifications to these aspects will be readily apparent to those skilled in the art, and the generic principles defined herein may be applied to other aspects without departing from the spirit or scope of the aspect. Thus, the present aspect is not intended to be limited to the aspects shown herein but is to be accorded the widest scope consistent with the principles and novel features disclosed herein.

What is claimed is:

1. A method in a wireless communication system, the method comprising:
   receiving a preamble comprising at least one physical frame structure parameter;
   determining a forward link physical frame structure by using the at least one physical frame structure parameter, wherein said determining the forward link physical frame structure comprises extracting a first portion of said preamble designated for broadcasting data; and
   determining a reverse link physical frame structure by using the at least one physical frame structure parameter.

2. The method as claimed in claim 1, further comprising:
   receiving at least one reverse link physical frame structure parameter and receiving at least one forward link physical frame structure parameter.

3. The method as claimed in claim 1, wherein said determining the forward link physical frame structure comprises demodulating said first portion of said preamble.

4. The method as claimed in claim 1, wherein receiving the at least one physical frame structure parameter further comprises receiving at least one of a cyclic prefix parameter and a bandwidth parameter.

5. The method as claimed in claim 1, wherein receiving the at least one physical frame structure parameter further comprises receiving a plurality of guard carriers parameters.

6. The method as claimed in claim 1, further comprising:
   receiving a forward link physical frame comprising at least one reverse link physical frame structure parameter; and
   determining the reverse link physical frame structure by using the at least one reverse link physical frame structure parameter.

7. A method in a wireless communication system, the method comprising:
   extracting physical frame structure parameters from a storage medium, wherein said extracting said physical frame structure parameters comprises extracting forward link physical frame structure parameters and extracting reverse link physical frame structure parameters;
   generating a preamble, wherein said preamble comprises said physical frame structure parameters, and wherein the preamble comprises a first portion designated for broadcasting data; and
   transmitting said preamble.

8. The method as claimed in claim 7, wherein said forward link physical frame structure parameters comprising at least one of a cyclic prefix parameter, a bandwidth parameter and a plurality of guard carrier parameters.

9. An apparatus operable in wireless communication, the apparatus comprising:
a processor, said processor configured to receive a preamble comprising at least one physical frame structure parameter;
said processor configured to extract a first portion of said preamble designated for broadcasting data to determine a forward link physical frame structure by using said received the at least one physical frame structure parameter; and
said processor configured to determine a reverse link physical frame structure by using the at least one physical frame structure parameter; and
a memory operably connected to said processor.

10. The apparatus as claimed in claim 9, wherein said processor is further configured to receive at least one reverse link physical frame structure parameter and is configured to receive at least one forward link physical frame structure parameter.

11. The apparatus as claimed in claim 9, wherein said processor is further configured to demodulate said first portion of said preamble.

12. The apparatus as claimed in claim 9, wherein said processor is further configured to receive at least one of a cyclic prefix parameter and a bandwidth parameter.

13. The apparatus as claimed in claim 9, wherein said processor is further configured to receive a plurality of guard carriers parameters.

14. The apparatus as claimed in claim 9, wherein said processor is further configured to receive a forward link physical frame comprising at least one reverse link physical frame structure parameter; and
said processor is configured to determine the reverse link physical frame structure by using the at least one reverse link physical frame structure parameter.

15. An apparatus operable in wireless communication, the apparatus comprising:
a processor, said processor configured to:
extract physical frame structure parameters from a storage medium, wherein said physical frame structure parameters comprise forward link physical frame structure parameters and reverse link physical frame structure parameters;
generate a preamble, wherein said preamble comprises said physical frame structure parameters, and wherein said preamble comprises a first portion designated for broadcasting data; and
transmit said preamble; and
a memory operably connected to said processor.

16. The apparatus as claimed in claim 15, wherein said forward link physical frame structure parameters further comprise at least one of a cyclic prefix parameter, a bandwidth parameter and a plurality of guard carrier parameters.

17. An apparatus operable in a wireless communication system, the apparatus comprising:
means for receiving a preamble comprising at least one physical frame structure parameter;
means for extracting a first portion of said preamble designated for broadcasting data to determine a forward link physical frame structure by using the at least one physical frame structure parameter; and
means for determining a reverse link physical frame structure by using the at least one physical frame structure parameter.

18. The apparatus as claimed in claim 17, further comprising:
means for receiving at least one reverse link physical frame structure parameter and means for receiving at least one forward link physical frame structure parameter.

19. The apparatus as claimed in claim 17, wherein the means for determining the forward link physical frame structure comprises means for demodulating said first portion of said preamble.

20. The apparatus as claimed in claim 17, wherein the means for receiving the preamble comprising the at least one physical frame structure parameter comprises means for receiving at least one of a cyclic prefix parameter and a bandwidth parameter.

21. The apparatus as claimed in claim 17, wherein the means for receiving the preamble comprising the at least one physical frame structure parameter comprises means for receiving a plurality of guard carriers parameters.

22. The apparatus as claimed in claim 17, further comprising:
means for receiving a forward link physical frame comprising at least one reverse link physical frame structure parameter; and
means for determining the reverse link physical frame structure by using the at least one reverse link physical frame structure parameter.

23. An apparatus operable in a wireless communication system, the apparatus comprising:
means for extracting physical frame structure parameters from a storage medium, wherein said means for extracting said physical frame structure parameters comprises means for extracting forward link physical frame structure parameters and means for extracting reverse link physical frame structure parameters;
means for generating a preamble, wherein said preamble comprises said physical frame structure parameters, and wherein said preamble comprises a first portion designated for broadcasting data; and
means for transmitting said preamble.

24. The apparatus as claimed in claim 23, wherein said forward link physical frame structure parameters further comprise at least one of a cyclic prefix parameter, a bandwidth parameter and a plurality of guard carrier parameters.

25. A non-transitory machine-readable medium for storing executable instructions including:
receiving a preamble comprising at least one physical frame structure parameter;
extracting a first portion of said preamble designated for broadcasting data to determine a forward link physical frame structure by using the at least one physical frame structure parameter; and
determining a reverse link physical frame structure by using the at least one physical frame structure parameter.

26. The non-transitory machine-readable medium as claimed in claim 25, further comprising:
machine readable instruction to cause receiving at least one reverse link physical frame structure parameter and receiving at least one forward link physical frame structure parameter.

27. The non-transitory machine-readable medium as claimed in claim 25, wherein machine readable instruction to cause receiving the preamble comprising the at least one physical frame structure parameter comprises machine readable instruction to cause receiving at least one of a cyclic prefix parameter and a bandwidth parameter.

28. The non-transitory machine-readable medium as claimed in claim 25, wherein machine readable instruction to cause receiving the preamble comprising the at least one physical frame structure parameter comprises machine readable instruction to cause receiving a plurality of guard carriers parameters.

29. A non-transitory machine-readable medium comprising instructions which, when executed by a machine, cause the machine to perform operations for storing executable instructions including:
- extracting physical frame structure parameters from a storage medium, wherein said physical frame structure parameters comprise forward link physical frame structure parameters and reverse link physical frame structure parameters;
- generating a preamble, wherein said preamble comprises said physical frame structure parameters, and wherein said preamble comprises a first portion designated for broadcasting data; and
- transmitting said preamble.

30. The non-transitory machine-readable medium as claimed in claim 29, wherein said forward link physical frame structure parameters further comprise at least one of a cyclic prefix parameter, a bandwidth parameter and a plurality of guard carrier parameters.

* * * * *